(12) United States Patent
Shao et al.

(10) Patent No.: US 8,175,041 B2
(45) Date of Patent: May 8, 2012

(54) SYSTEM AND METHOD FOR WIRELESS COMMUNICATION OF AUDIOVISUAL DATA HAVING DATA SIZE ADAPTATION

(75) Inventors: Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 733 days.

(21) Appl. No.: 11/833,919

(22) Filed: Aug. 3, 2007

(65) Prior Publication Data

US 2008/0144553 A1 Jun. 19, 2008

Related U.S. Application Data

(60) Provisional application No. 60/875,021, filed on Dec. 14, 2006.

(51) Int. Cl.
*H04W 4/00* (2009.01)
*H04B 7/00* (2006.01)

(52) U.S. Cl. .......................... 370/329; 370/341

(58) Field of Classification Search .................. None
See application file for complete search history.

(56) References Cited

U.S. PATENT DOCUMENTS

| 5,233,348 | A | 8/1993 | Pollmann et al. |
| 5,680,129 | A | 10/1997 | Weinberger et al. |
| 5,978,545 | A | 11/1999 | Kato et al. |
| 6,108,382 | A | 8/2000 | Gringeri et al. |
| 6,201,834 | B1 | 3/2001 | Zhu |
| 6,519,005 | B2 | 2/2003 | Bakhmutsky et al. |
| 6,532,268 | B1 | 3/2003 | Morisawa |

(Continued)

FOREIGN PATENT DOCUMENTS

JP 2003/152733 A 5/2003

(Continued)

OTHER PUBLICATIONS

Lettieri et al. "Adaptive frame length control for improving wireless link throughput, range, and energy efficiency", *INFOCOM* Seventeenth Annual Joint Conference of the *IEEE* Computer and Communication Societies, vol. 2 (Mar.-Apr. 1998), 8 pages.

(Continued)

*Primary Examiner* — Chi Pham
*Assistant Examiner* — Soon-Dong Hyun
(74) *Attorney, Agent, or Firm* — Kenneth L. Sherman, Esq.; Michael Zarrabian, Esq.; Sherman & Zarrabian LLP

(57) ABSTRACT

A system and method for wireless communication of audiovisual data are disclosed. One embodiment of the system includes a wireless transmitter and a wireless receiver configured to change the size of audiovisual data in response to a change in the condition of a wireless channel. The wireless transmitter is configured to transmit the audiovisual data over the wireless channel. The wireless receiver is configured to receive the audiovisual data over the wireless channel. The wireless transmitter includes an application layer, media access control (MAC) layer, and physical (PHY) layer. The wireless receiver includes an application layer, MAC layer, and PHY layer. The application or MAC layer of the wireless transmitter is configured to change the size of the audiovisual data in response to a change in the condition of the wireless channel. The application or MAC layer of the wireless receiver is configured to restore the size of the audiovisual data.

50 Claims, 13 Drawing Sheets

U.S. PATENT DOCUMENTS

| | | | |
|---|---|---|---|
| 6,597,402 | B1 | 7/2003 | Butler et al. |
| 6,618,397 | B1 | 9/2003 | Huang |
| 6,756,921 | B2 | 6/2004 | Kimura et al. |
| 6,868,186 | B1 | 3/2005 | Sadeh |
| 6,879,266 | B1 | 4/2005 | Dye et al. |
| 6,915,016 | B2 | 7/2005 | Varshney et al. |
| 6,966,065 | B1 | 11/2005 | Kitazato et al. |
| 7,146,185 | B2 | 12/2006 | Lane |
| 7,184,588 | B2 | 2/2007 | Proteau et al. |
| 7,313,810 | B1 | 12/2007 | Bell et al. |
| 7,340,764 | B2 | 3/2008 | Kubota et al. |
| 7,385,921 | B2 | 6/2008 | Itakura et al. |
| 7,492,789 | B2 | 2/2009 | Shvodian |
| 7,512,180 | B2 | 3/2009 | Florencio |
| 7,664,185 | B2 | 2/2010 | Zhang et al. |
| 7,752,647 | B2 | 7/2010 | Fung |
| 7,868,879 | B2 | 1/2011 | Rizko |
| 2002/0042917 | A1* | 4/2002 | Townsend et al. ............... 725/41 |
| 2002/0071485 | A1 | 6/2002 | Caglar et al. |
| 2002/0118763 | A1* | 8/2002 | Harris et al. ............. 375/240.28 |
| 2002/0184384 | A1 | 12/2002 | Simmon et al. |
| 2003/0012222 | A1* | 1/2003 | Rinchiuso ..................... 370/468 |
| 2003/0174243 | A1* | 9/2003 | Arbeiter et al. ............ 348/384.1 |
| 2004/0156354 | A1 | 8/2004 | Wang et al. |
| 2005/0123042 | A1 | 6/2005 | Park |
| 2005/0208961 | A1 | 9/2005 | Willenegger |
| 2007/0014356 | A1 | 1/2007 | Han et al. |
| 2007/0047485 | A1* | 3/2007 | Gorokhov et al. ............ 370/329 |
| 2007/0097257 | A1* | 5/2007 | El-Maleh et al. .......... 348/419.1 |
| 2007/0110396 | A1 | 5/2007 | Itoh et al. |
| 2007/0189383 | A1 | 8/2007 | Shao et al. |
| 2007/0189397 | A1 | 8/2007 | Ngo et al. |
| 2007/0195893 | A1* | 8/2007 | Kim et al. ................. 375/240.27 |
| 2007/0202842 | A1 | 8/2007 | Shao et al. |
| 2007/0202843 | A1 | 8/2007 | Niu et al. |
| 2007/0206875 | A1* | 9/2007 | Ida et al. ........................ 382/242 |
| 2007/0223823 | A1* | 9/2007 | Islam et al. .................... 382/232 |
| 2007/0230461 | A1 | 10/2007 | Singh et al. |
| 2007/0234134 | A1 | 10/2007 | Shao et al. |
| 2007/0268972 | A1 | 11/2007 | Kim |
| 2008/0037624 | A1* | 2/2008 | Walker et al. ............ 375/240.01 |
| 2008/0043832 | A1 | 2/2008 | Barkley et al. |
| 2008/0063069 | A1* | 3/2008 | Sekiguchi et al. ....... 375/240.16 |
| 2008/0123739 | A1 | 5/2008 | Reznic et al. |
| 2008/0204461 | A1 | 8/2008 | Hutchins et al. |
| 2009/0021646 | A1 | 1/2009 | Shao et al. |
| 2009/0063935 | A1 | 3/2009 | Singh et al. |
| 2009/0086638 | A1 | 4/2009 | Niu et al. |
| 2009/0086699 | A1 | 4/2009 | Niu et al. |
| 2009/0109866 | A1* | 4/2009 | Kim et al. ...................... 370/252 |
| 2009/0241147 | A1 | 9/2009 | Kim et al. |
| 2009/0265744 | A1 | 10/2009 | Singh et al. |

FOREIGN PATENT DOCUMENTS

| | | |
|---|---|---|
| WO | WO 2004/034654 | 4/2004 |
| WO | WO 2004/073201 A1 | 8/2004 |

OTHER PUBLICATIONS

Modiano, Eytan, "An adaptive algorithm for optimizing the packet size used in wireless ARQ protocols", *Wireless Networks*, vol. 5, No. 4 pp. 279-286 (Jul. 1999).

International Search Report dated Mar. 10, 2008 (International Application No. PCT/KR2007/006148).

Hachman, "CE Giants back Amimon's Wireless HDTV Tech," PCMAG.com 1 page (Jul. 23, 2008).

"NEC develops compact millimeter-wave transceiver for uncompressed HDTV signal transmission," *NE Asia Online*, Apr. 5, 2005, (Downloaded from http://neasia.nikkeibp.com/topstory/000913 on Sep. 29, 2006.).

WirelessHD Specification Version 1.0 Overview, Oct. 9, 2007, 77 pages.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf] , pp. 1-6.

EIA/CEA-861-B, A DTV Profile for Uncompressed High Speed Digital Interfaces, EIA Engineering Standarts and Publications, Electronic Industries Alliance Technology Strategy & Standards Department, Arlington, VA., May 2002, pp. 1-134.

Gharai et al., RTP Payload Format for Uncompressed Video, Network Working Group, Request for Comments: 4175; The Internet Society, Sep. 2005, pp. 1-17.

Hitachi et al., High-Definition Multimedia Interface (HDMI) Specification Version 1.3, Jun. 22, 2006, pp. 1-237.

Hitachi et al., High-Definition Multimedia Interface (HDMI) Specifications version 1.2, Aug. 22, 2005, pp. 1-214.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003, pp. 1-362.

Information technology—JPEG 2000 image coding system—Part 11: Wireless. ISO/IEC JTC 1/SC 29 (Mar. 21, 2005), pp. 1-71.

Maruhashi et al., Wireless uncompressed-HDTV-signal; transmission system utilizing compact 60-GHz-band transmitter and receiver, Microwave Symposium Digest, 2005 IEEE MTTS International, Jun. 12-17, 2005, pp. 1867-1870.

MBOA, Distributed Medium Access Control (MAC) for wireless networks, WiMedia Alliance, Draft 0.99, Nov. 1, 2005, pp. 1-182.

Wang et al., Error Control and Concealment for Video Communication: A Review, Proceedings of the IEEE, 86(5): 974-997 (May 1998).

International Preliminary Report on Patentability & Written Opinion dated Aug. 19, 2008 for PCT/KR2007/000802, filed Feb. 15, 2007.

International Preliminary Report on Patentability & Written Opinion dated Aug. 19, 2008 for PCT/KR2007/000827, filed Feb. 15, 2007.

International Preliminary Report on Patentability & Written Opinion dated Jun. 16, 2009 for PCT/KR2007/006148, filed Nov. 30, 2007.

International Preliminary Report on Patentability & Written Opinion dated May 19, 2009 for PCT/KR2007/003251, filed Jul. 4, 2007.

International Preliminary Report on Patentability & Written Opinion dated Sep. 30, 2008 for PCT/KR2007/001527, filed Mar. 29, 2007.

International Search Report dated Feb. 15, 2007 for PCT/KR2007/000827, filed Feb. 15, 2007.

International Search Report dated Jul. 9, 2007 for PCT/KR2007/001527, filed Mar. 29, 2007.

International Search Report dated May 22, 2007 for PCT/KR2007/000802, filed Feb. 15, 2007.

International Search Report dated Oct. 12, 2007 for PCT/KR2007/003251, filed Jul. 4, 2007.

U.S. Office Action dated Jun. 3, 2010 in U.S. Appl. No. 11/728,244, filed Mar. 22, 2007.

U.S. Non-final Office Action for U.S. Appl. No. 12/107,685 mailed Oct. 13, 2010.

U.S. Final Office Action for U.S. Appl. No. 12/107,685 mailed Apr. 21, 2011.

U.S. Non-Final Office Action for U.S. Appl. No. 11/635,969 mailed Oct. 25, 2011.

U.S. Non-final Office Action for U.S. Appl. No. 12/107,685 mailed Sep. 6, 2011.

U.S. Notice of Allowance for U.S. Appl. No. 12/107,685, mailed Jan. 5, 2012.

* cited by examiner

SYSTEM AND METHOD FOR WIRELESS COMMUNICATION OF AUDIOVISUAL DATA HAVING DATA SIZE ADAPTATION

CROSS-REFERENCE TO RELATED APPLICATIONS

This application claims priority from U.S. Provisional Patent Application No. 60/875,021 filed on Dec. 14, 2006, the disclosure of which is incorporated herein by reference.

BACKGROUND OF THE INVENTION

1. Field

The present invention relates to transmission of audiovisual data, and in particular, to transmission of uncompressed audiovisual data over wireless channels.

2. Description of the Related Technology

With the proliferation of high quality video, an increasing number of electronic devices, such as consumer electronic devices, utilize high definition (HD) video which can require about 1 to several Gbps (gigabits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices which do not have the bandwidth to carry the uncompressed HD signals are connected.

Wireless communication systems for transmitting audiovisual data can experience varying wireless channel conditions. Varying wireless channel conditions, particularly channel quality degradation, can adversely affect data transmission quality. In uncompressed audiovisual data transmission, because a large amount of data is transmitted over a wireless channel, channel quality degradation can significantly adversely affect the data transmission quality.

One conventional approach to solve this problem is to switch the data format of the audiovisual data at an audio/video (A/V) input module on the transmission side and an A/V playback module on the receiver side such that the data format fits into the reduced data transmission rate available at the wireless channel. During the data format switching, the audiovisual data stream is temporarily stopped, which results in an interruption in playing back the data. Such an interruption may take a few seconds, which is not favorable to users. Thus, there is a need to provide a wireless system and method which can effectively accommodate channel quality degradation while not adversely affecting audiovisual data playback.

SUMMARY OF CERTAIN INVENTIVE ASPECTS

One inventive aspect is a method of wireless communication for audiovisual data. The method comprises: processing audiovisual data at the wireless module of a source, the source wireless module being in communication with a wireless module of a sink over a wireless channel, wherein processing the audiovisual data at the source wireless module comprises changing the size of the audiovisual data in response to a change in the condition of the wireless channel; transmitting the audiovisual data from the source wireless module to the sink wireless module over the wireless channel; and processing the audiovisual data at the sink wireless module, wherein processing the audiovisual data at the sink wireless module comprises restoring the size of the audiovisual data.

Another inventive aspect is a system for wireless communication of audiovisual data. The system comprises: a transmitter configured to transmit audiovisual data over a wireless channel, the transmitter comprising an application layer, media access control (MAC) layer, and physical (PHY) layer, wherein at least one of the transmitter MAC layer and the transmitter application layer is configured to change the size of the audiovisual data in response to a change in the condition of the wireless channel; and a receiver configured to receive the audiovisual data over the wireless channel, the receiver comprising an application layer, MAC layer, and PHY layer, wherein at least one of the receiver MAC layer and the receiver application layer is configured to restore the size of the audiovisual data.

Yet another inventive aspect is a wireless communication device for transmitting audiovisual data. The device comprises a transmitter configured to transmit audiovisual data over a wireless channel. The transmitter comprises an application layer; a media access control (MAC) layer; and a physical (PHY) layer, wherein at least one of the MAC layer and the application layer is configured to change the size of the audiovisual data in response to a change in the condition of the wireless channel.

Another inventive aspect is a wireless communication device for receiving audiovisual data. The device comprises a receiver configured to receive audiovisual data over a wireless channel. The receiver comprises an application layer; a media access control (MAC) layer; and a physical (PHY) layer, wherein at least one of the MAC layer and the application layer is configured to change the size of the audiovisual data in response to a change in the condition of the wireless channel.

Another inventive aspect is a method of wireless communication for audiovisual data. The method comprises: receiving audiovisual data at a receiver from a wireless channel, the receiver comprising a media access control (MAC) layer and an application layer; determining the condition of the wireless channel and feedbacking the channel condition to the transmitter; and changing the size of the audiovisual data at at least one of the MAC layer and the application layer in response to the wireless channel condition determining.

Another inventive aspect is a system for wireless communication of audiovisual data. The system comprises: a receiver configured to receive audiovisual data over a wireless channel, the receiver comprising a media access control (MAC) layer and an application layer; wherein the system is configured to determine the condition of the wireless channel and feedbacking the channel condition to the transmitter; wherein at least one of the MAC layer and the application layer is configured to change the size of the audiovisual data in response to a change in the wireless channel condition.

DETAILED DESCRIPTION OF CERTAIN INVENTIVE EMBODIMENTS

Figure 1:
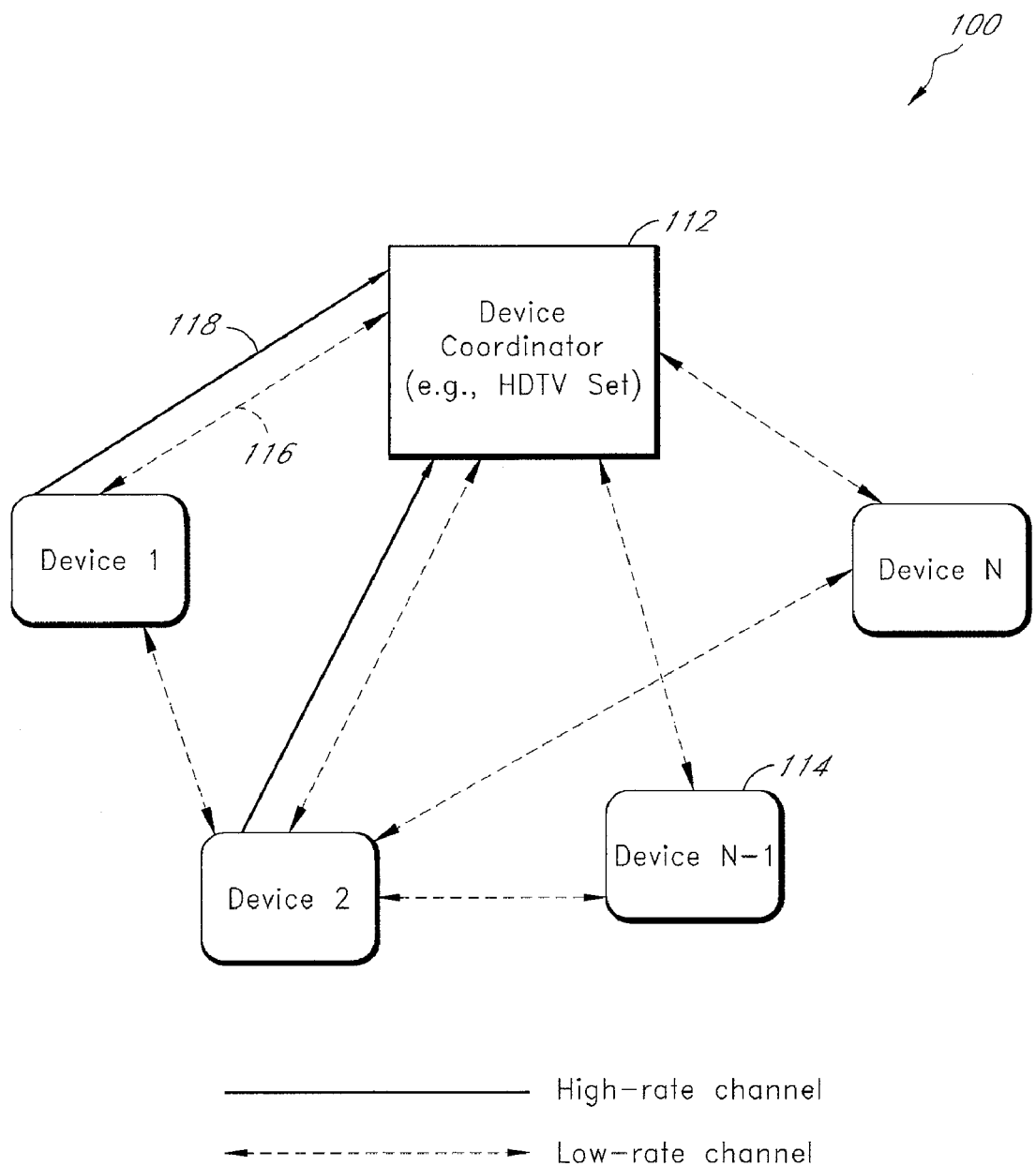
FIG. 1 is a block diagram of a wireless network that implements uncompressed HD video transmission between wireless devices, according to one embodiment of the invention.

Various aspects and features of the invention will become more fully apparent from the following description and appended claims taken in conjunction with the foregoing drawings. In the drawings, like reference numerals indicate identical or functionally similar elements.

Certain embodiments of the invention provide a method and system for transmission of uncompressed HD video information from a sender to a receiver over wireless channels. Example implementations of the embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments of the invention. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate wireless channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channels. At any one time, the low-rate and high-rate channels cannot be used in parallel for transmission, in certain embodiments. Beamformning technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
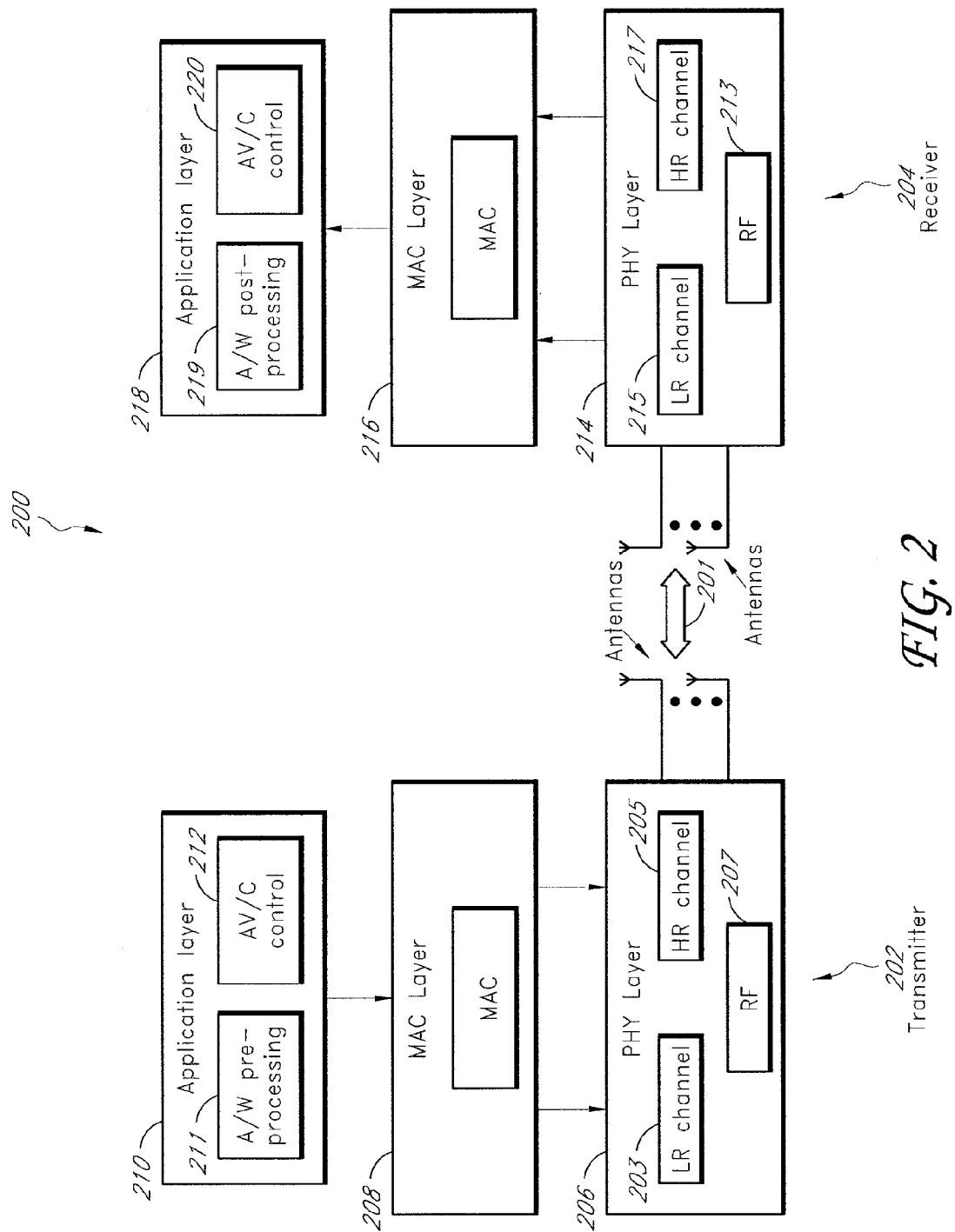
FIG. 2 is a block diagram of an example communication system for transmission of uncompressed HD video over a wireless medium, according to one embodiment of the invention.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
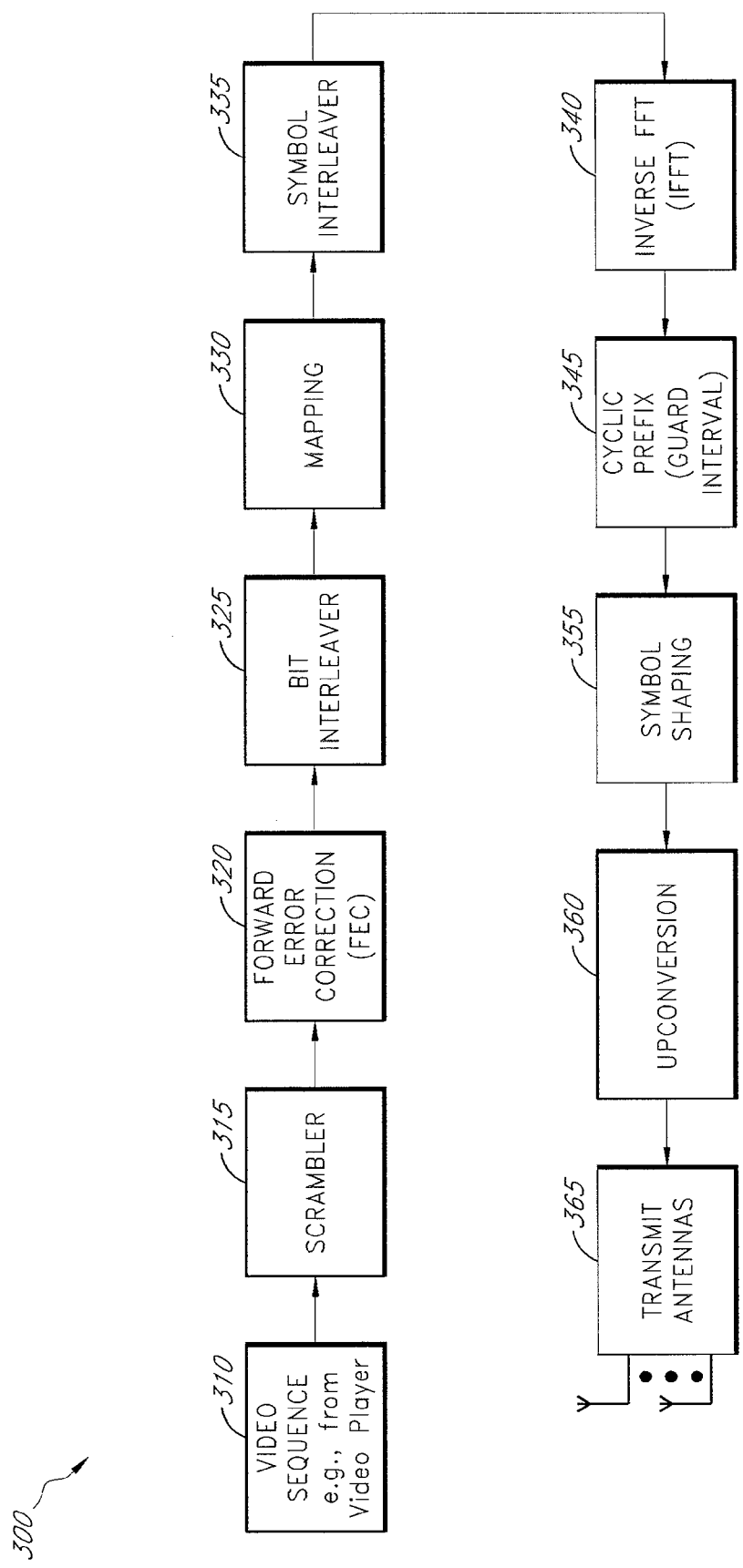
FIG. 3 is a block diagram of an example transmitter for transmission of uncompressed HD video over a wireless medium, according to one embodiment of the invention.

FIG. 3 is a functional block diagram illustrating an example of a transmit chain 300 comprising modules, subsystems or devices, such as used in the PHY block 206 (FIG. 2). It will be appreciated that these modules, subsystems, or devices can be implemented using hardware, software or a combination of both. A video sequence 310 having video data, such as from a video player or other device, is input into a scrambler 315. The scrambler 315 transposes or inverts signals or otherwise encodes data to make the data unintelligible at a receiver not equipped with a corresponding descrambling device. Scrambling is accomplished by the addition of components to the original signal or the changing of some important component of the original signal in order to make extraction of the original signal difficult. Examples of the latter can include removing or changing vertical or horizontal sync pulses in video signals.

A forward error correction (FEC) subsystem 320 receives output from the scrambler and provides protection against noise, interference and channel fading during wireless data transmission. The FEC subsystem 320 adds redundant data to the scrambled video data input to the subsystem. The redundant data allows the receiver to detect and correct errors without asking the transmitter for additional data. In adding redundant data to the video data, the FEC subsystem 320 can use various error correction codes, such as a Reed-Solomon (RS) encoder and a convolutional code (CC) encoder. In other embodiments, the FEC subsystem 320 may use various other encoders, including, but not limited to, a LDPC encoder, a Hamming encoder, and a Bose, Ray-Chaudhuri, Hocquenghem (BCH) encoder.

The output of the FEC 320 is sent to a bit interleaver 325. The bit interleaver 325 rearranges a sequence of data bits received from the FEC 320. The bit interleaver 325 serves to provide further error-protection over video data transmitted over a wireless medium. The output of the bit interleaver 325 is sent to a mapper 330. The mapper 330 maps data bits to complex (IQ) symbols. The complex symbols are used to modulate a carrier for the wireless transmission described above. The mapper 330 can use various modulation schemes, including, but not limited to, Binary Phase-Shift Keying (BPSK), Quadrature Phase-Shift Keying (QPSK), and Quadrature Amplitude Modulation (QAM). In one embodiment, the mapper 330 is a QAM mapper, for example, a 16-QAM mapper or 64-QAM mapper. QAM is a modulation scheme which conveys data by modulating the amplitude of two carrier waves. The two waves, usually two orthogonal sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing the collection of such symbols.

The output of the mapper 330 is sent to a symbol interleaver 335 that rearranges the sequence of complex symbols output from the mapper. The illustrated symbol interleaver 335 is positioned after the mapper 330. In other embodiments, the symbol interleaver 335 may be positioned between the FEC and the mapper 330 in place of the bit interleaver. In such embodiments, the symbol interleaver permutes the predetermined number of bits as a symbol group. For example, in an embodiment where a QAM mapper maps four data bits to a complex symbol, the symbol interleaver is configured to interleave groups of four data bits.

In an embodiment where the symbol interleaver 335 is positioned after the mapper 330, the symbol interleaver rearranges the sequence of the symbols output from the mapper 330. In one embodiment, the symbol interleaver 335 can include a random interleaver which employs a fixed random permutation order and interleaves symbols according to the permutation order. For example, the random interleaver may use Radix-2 FFT (fast fourier transform) operation. In other embodiments, the symbol interleaver 335 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols.

The output of the symbol interleaver 335 is sent to an inverse Fast Fourier Transform (IFFT) module 340. The IFFT 340 transforms frequency domain data from the error-correcting, mapping and interleaving modules back into corresponding time domain data. The IFFT module 340 converts a number of complex symbols, which represent a signal in the frequency domain, into the equivalent time domain signal. The IFFT module 340 also serves to ensure that carrier signals produced are orthogonal. The output of the IFFT 340 is sent to a cyclic prefix adder 345 so as to decrease receiver complexity. The cyclic prefix adder 345 may also be referred to as a guard interval inserter. The cyclic prefix adder 345 adds a cyclic prefix interval (or guard interval) to an IFFT-processed signal block at its front end. The duration of such a cyclic prefix interval may be $\frac{1}{32}$, $\frac{1}{16}$, $\frac{1}{8}$, or $\frac{1}{4}$ of the original signal block duration, depending on realistic channel conditions and affordable receiver complexity.

At this point of the transmit chain 300, a preamble is part of the header 310 and prior to the IFFT-processed signal block. Generally, a preamble is selected by the designers of the system 200, such as previously described, and is standardized so that all devices of the system understand it. The use of preamble is to detect start of the packet, estimate various channel parameters, such as symbol timing, carrier frequency offset so that data reception can be done successfully.

A symbol shaping module 355 interpolates and low-pass filters the packet signal generated from the IFFT module 340, the cyclic prefix adder 345 and the preamble. The output of the symbol shaping module 355 is a complex baseband of the output signal of the IFFT module 340. An upconverter 360 upconverts the output of the symbol shaping module 355 to a radio frequency (RF) for possible meaningful transmission. A set of transmit antennas 365 transmit the signal output from the upconverter 360 over a wireless medium, such as the wireless channel 201 (FIG. 2) to a receiver. The transmit antennas 365 can include any antenna system or module suitable for wirelessly transmitting uncompressed HD video signals.

Figure 4:
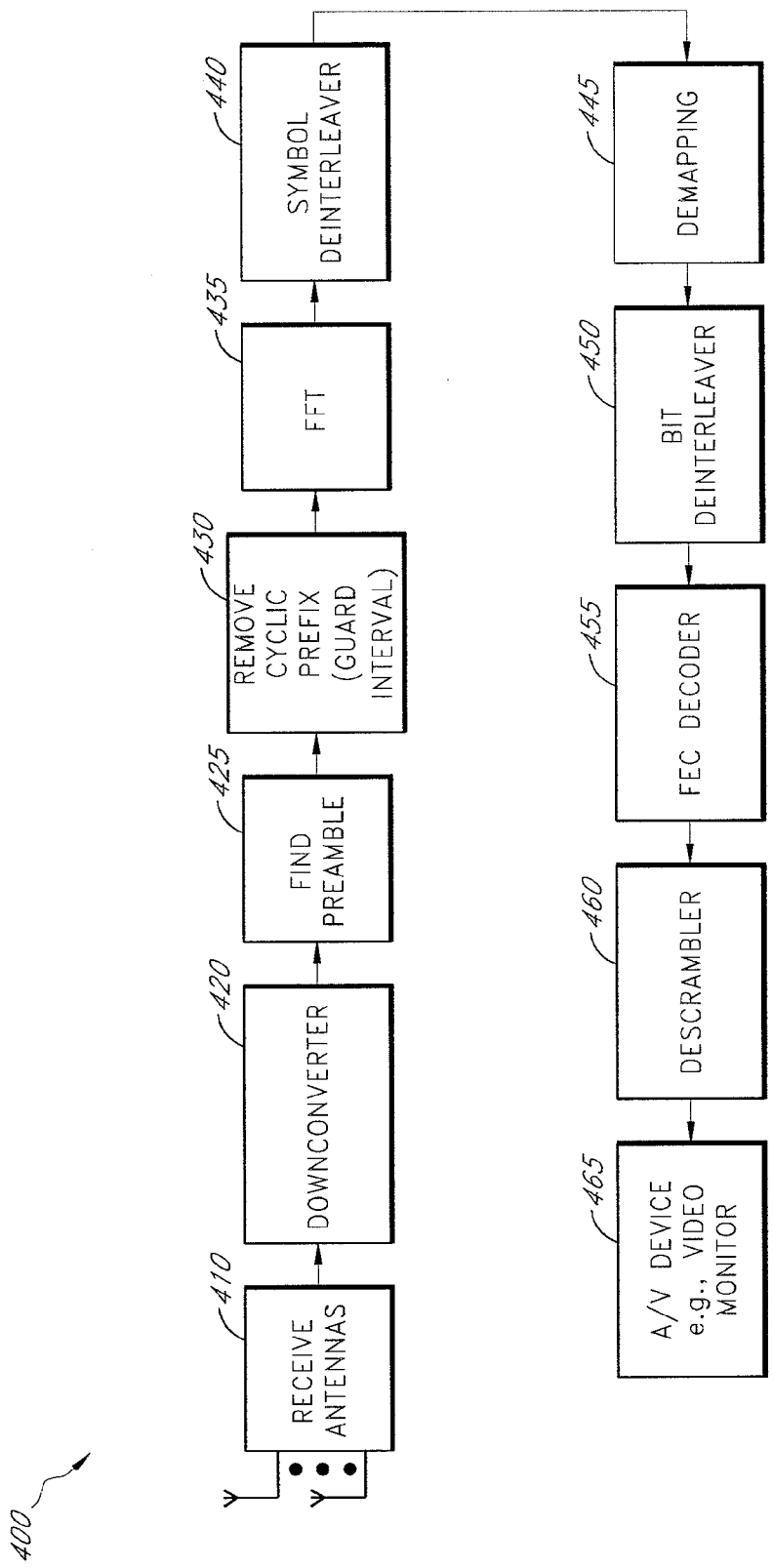
FIG. 4 is a block diagram of an example receiver for receipt of uncompressed HD video over a wireless medium, according to one embodiment of the invention.
Figure 7:
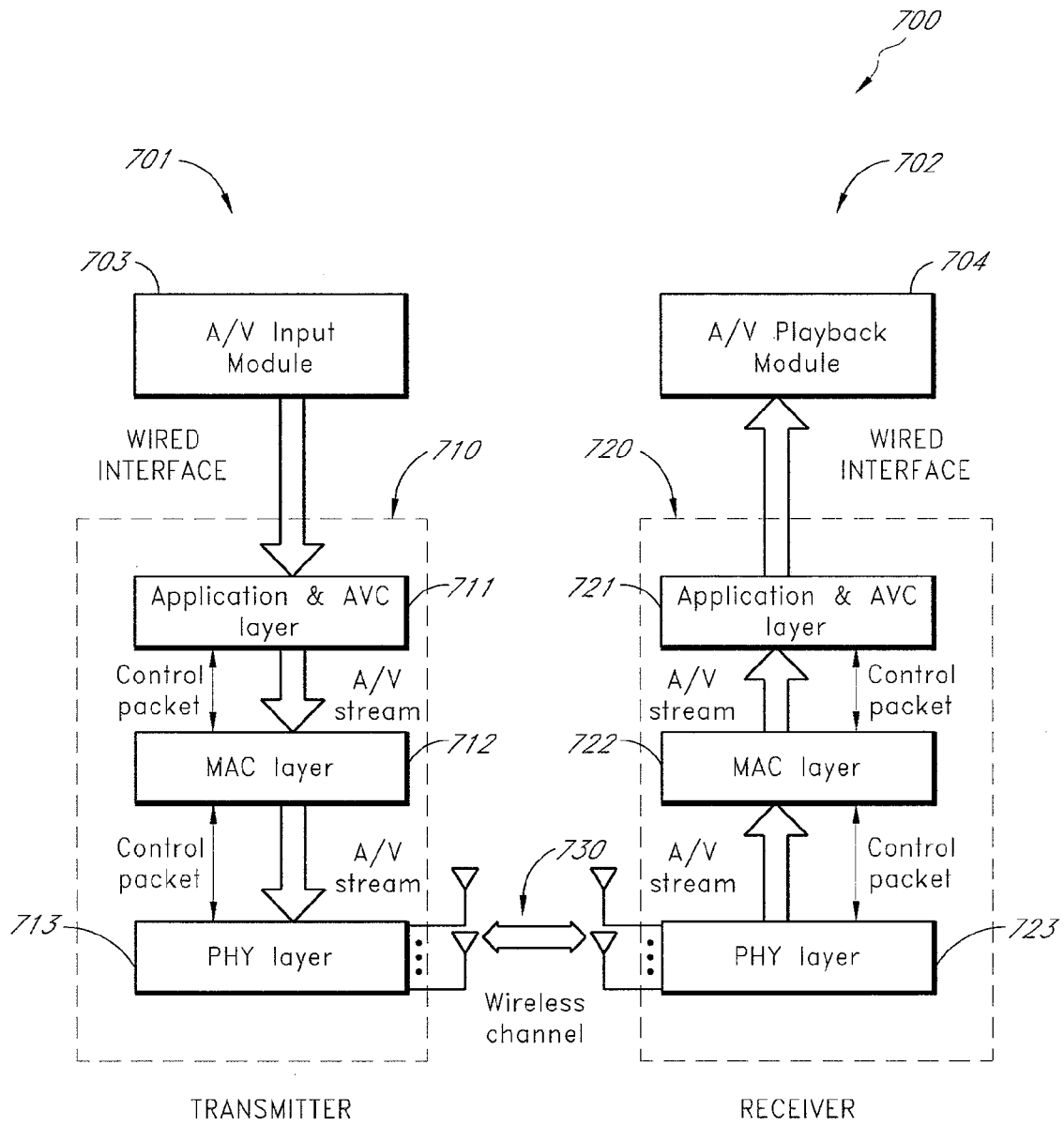
FIG. 7 is a block diagram of an example communication system for transmission of audiovisual data over a wireless channel, according to one embodiment of the invention.

FIG. 4 is a functional block diagram illustrating a receiver chain 400 of modules, subsystems or devices, such as used in the PHY block 214 (FIG. 2). The receiver chain 400 generally performs an inverse process of that of the transmitter chain 300 of FIG. 3. The receiver 400 receives an RF signal via the wireless channel 201 (FIG. 2) at receive antennas 410 from the transmit antennas 365 of the transmitter chain 300. A downconverter 415 downconverts the RF signal to a signal of a frequency suitable for processing, or the baseband signal, which is already in the digital domain for easy digital signal processing. A preamble finder 420 then locates a preamble portion of the digital signal, finds the symbol starting timing, estimates the channel coefficients, estimates the carrier frequency offset and tries to compensate it via local processing. In certain embodiments, the preamble finder 420 includes a correlator and a packet start finding algorithm that can operate on the short training sequences of the preamble (FIGS. 4 and 7). After the preamble is identified by the finder 420, the preamble portion of a current signal packet is sent to a channel estimation, synchronization and timing recovery component 425, which will be further described below. A cyclic prefix remover 430 removes the cyclic prefix from the signal. Next, a fast Fourier transform (FFT) module 435 transforms the signal (a time-domain signal) into a frequency-domain signal. The output of the FFT 435 is used by a symbol deinterleaver 440 which rearranges the FFT output for a demapper 445. The demapper 445 converts the frequency-domain signal (a complex signal) into a bit stream in the time domain. A bit deinterleaver 450 rearranges the bit stream in the original bit stream sequence as before the bit interleaver 325 of FIG. 3.

Subsequently to the bit deinterleaving, a FEC decoder 455 decodes the bit stream, thereby removing redundancy added by the FEC 320 of FIG. 3. In one embodiment, the FEC decoder 455 includes a demultiplexer, a multiplexer, and a plurality of convolutional code (CC) decoders interposed between the demultiplexer and the multiplexer. Finally, a descrambler 460 receives the output from the FEC decoder 455, and then descrambles it, thereby regenerating the video data sent from the transmitter chain 300 of FIG. 3. A video device 465 can now display video using the video data. Examples of the video device include, but are not limited to, a CRT television, an LCD television, a rear-projection television and a plasma display television. It will be appreciated that audio data can also be processed and transmitted in the same manner along with video data by the wireless HD A/V system described above. The audio data can be processed and transmitted using a different wireless transmission scheme. The descrambler 460, FEC decoder 455, bit deinterleaver 450, demapper 445, symbol deinterleaver 440, FFT 435 cyclic prefix remover 430, down-converter 415 and receive antennas 410 of the receiver chain 400 perform analogous but inverse functions of the corresponding scrambler 315, FEC 320, bit interleaver 325, mapper 330, symbol interleaver 335, IFFT 340, cyclic prefix adder 345, upconverter 360 and transmit antennas 365 of the transmit chain 300.

Video signals can be represented by pixel data that encodes each pixel as several values, e.g., using a RGB color model (red, green, and blue), or a YUV (one luminance and two chrominance values). Generally, viewers are more sensitive to transmission errors or loss of data in the most significant bits (MSB) of pixel values than to errors or loss in the least significant bits (LSB) of pixel values. Thus, in one embodiment, the MSB of each pixel value (e.g. 4 out of 8 bits per color channel) is encoded with a more robust coding and/or modulation scheme than for the remaining LSB of each pixel value.

As described above with reference to FIG. 1, the wireless HD A/V system can include a low-rate (LR) channel and a high-rate (HR) channel according to one embodiment. The two channels operate in time-division duplex (TDD) mode, i.e., only one channel can be activated at any given instance.

Figure 5B:
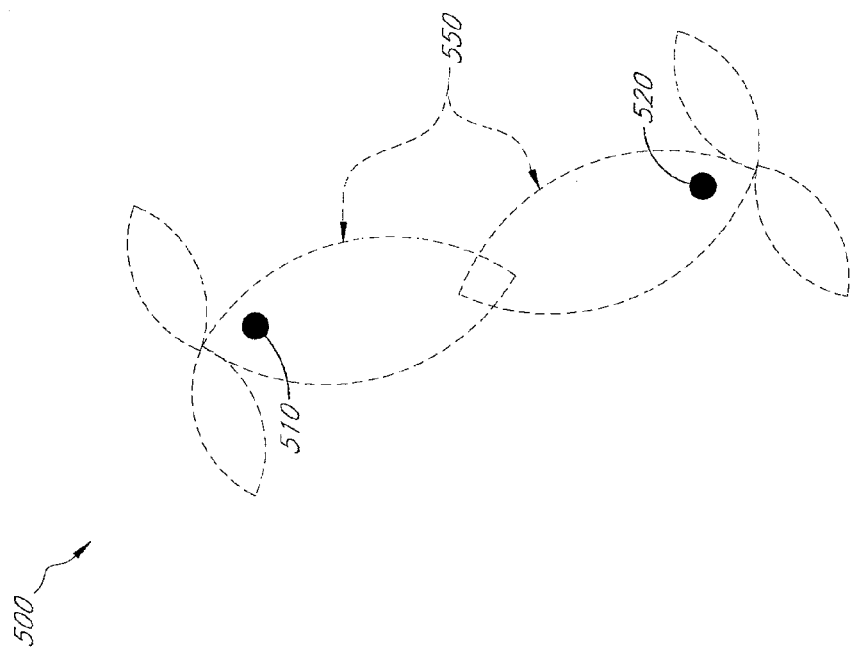
FIG. 5B is a diagram illustrating a high rate (HR) channel for uncompressed HD video transmission and a low rate (LR) channel for acknowledgment signal transmission, according to another embodiment of the invention.
Figure 5A:
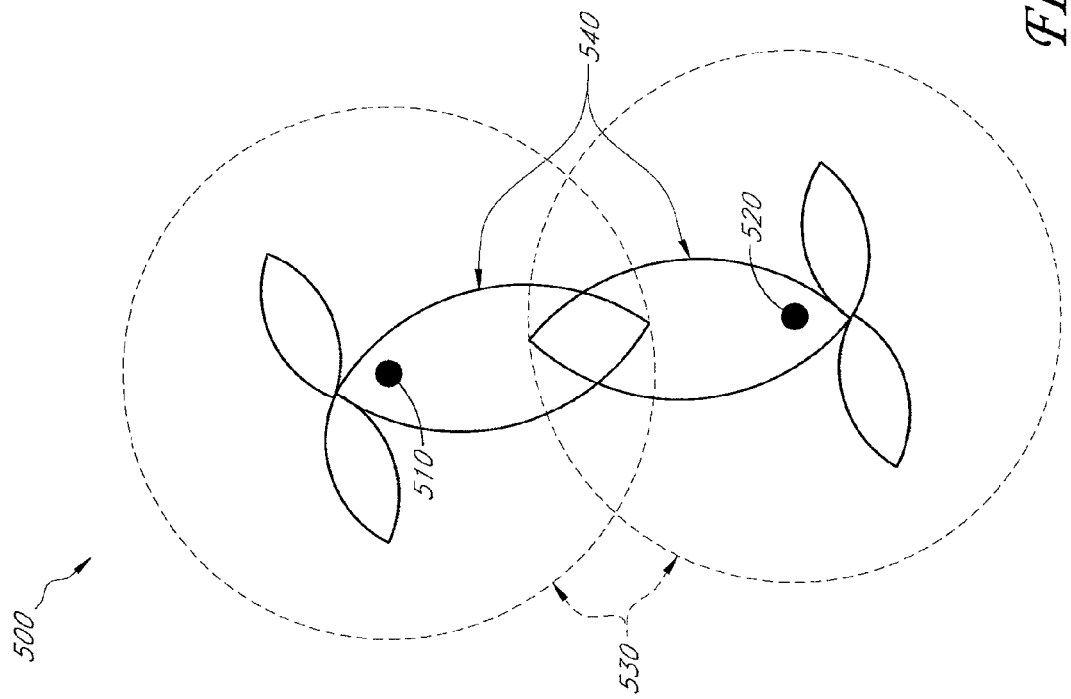
FIG. 5A is a diagram illustrating a low rate (LR) channel for uncompressed HD video transmission, according to one embodiment of the invention.

FIG. 5A is a diagram illustrating a low-rate (LR) channel established between two devices in the wireless system 500 according to one embodiment. Examples of the devices include, but are not limited to, a DVD player, an HD television, a home theater device, a media server, a printer, and an overhead projector. The illustrated system 500 includes a display device 510 (e.g., HD television, an overhead projector, etc.) and a video source device 520 (e.g., a set-top box (STB), a DVD player, a VCR, a TiVo® recorder, etc.). In the illustrated embodiment, the video source device 520 is a sender of video data whereas the display device 510 is a receiver. In other embodiments, if a high rate channel between the devices 510, 520 is symmetric, the video source device 520 may also operate as a receiver whereas the display device 510 serves as a sender depending on the direction of data transmission. For example, the display device 510 (e.g., an HD television) may receive broadcast video data and send it to the video source device 520 (e.g., a DVD recorder) for storing the video data.

The LR channel is a symmetric control channel. The LR channel may operate in two modes: omni-directional mode 530 and directional (beam-formed) mode 540.

The omni-directional mode 530 is used for transmission of control data such as beacon, association and disassociation, device discovery, and the like. The omni-directional mode 530 can support a data rate of about 2.5 to about 10 Mbps. The omni-directional mode 530 can be established using any suitable omni-directional antennas. The omni-directional antennas are configured to radiate power substantially uniformly in all directions. Examples of the omni-directional antennas include, but are not limited to, a whip antenna, a vertically oriented dipole antenna, a discone antenna, and a horizontal loop antenna.

The directional mode 540 can be used for transmitting some control data (e.g., acknowledgment (ACK)), and low-volume data (e.g., audio data). The directional mode 540 may support a data rate of about 20 to about 40 Mbps. The directional mode 540 can be established by forming a beam between the two devices 510, 520 in the system. It will be appreciated that any suitable directional antennas can be adapted for beam-forming. A skilled technologist will appreciate that various communication technologies can be adapted for implementing the directional or omni-directional modes.

FIG. 5B is a diagram illustrating an asymmetric directional channel 550 established between a display device 510 (e.g., a digital TV (DTV)) and a video source device 520 (e.g., a set-top box (STB), a DVD player (DVD)) in the wireless system 500 according to one embodiment. The directional channel can include a high rate (HR) channel and a low rate (LR) channel. The channel 550 can be established by forming a beam between the devices 510, 520. The HR channel can be used for transmission of uncompressed video data from the video source device 520 to the display device 510. The HR channel may support a data rate of about 1 to about 4 Gbps. The packet transmission duration on the HR channel can be about 100 μs to about 300 μs. In the illustrated embodiment, the display device 510 can send ACK to the video source device 520 via the LR channel after receiving video data from the video source device 520.

In one embodiment, the wireless communication system 500 is configured to wirelessly transmit uncompressed HD television signals. The wireless communication system 500 can use 60 GHz-band millimeter wave technology to transmit signals at a rate of about 1 to about 4 Gbps. The wireless system 500 can use the high-rate (HR) directional channel for transmitting/receiving HD signals. The system 500 may support 1080p HD formats which requires a raw data rate of 2.98 Gbps (frame size×the number of frames per second=(1920×1080×3×8)×60).

Figure 6:
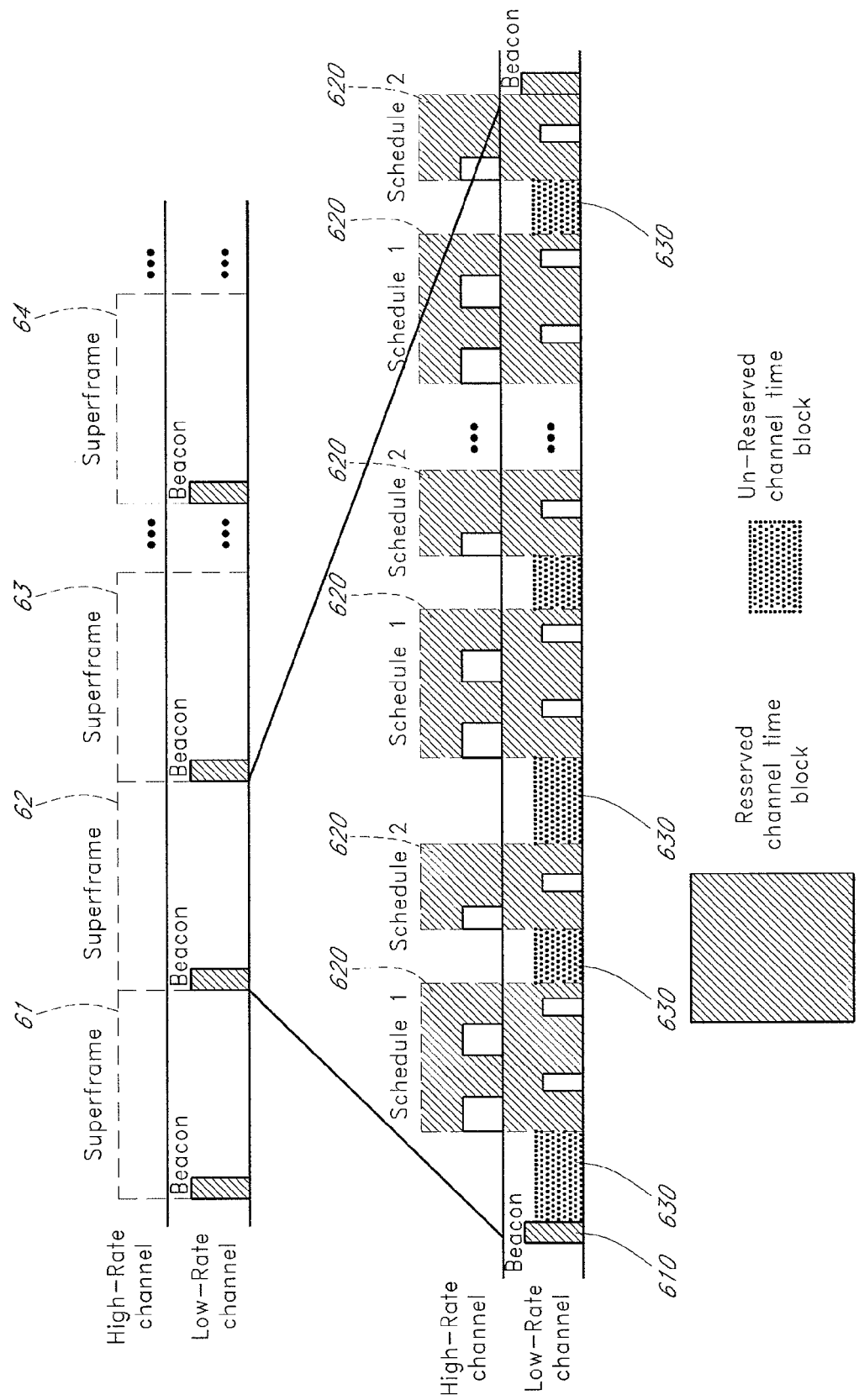
FIG. 6 is a timeline for packet transmission using Time Division Duplex (TDD) scheduling, according to one embodiment of the invention.

In one embodiment, the wireless HD A/V system described above can use a data transmission timeline shown in FIG. 6 for wireless communication between two devices in the system. One of the devices in the system can act as a controller which is responsible for managing superframes 61-64. In the illustrated embodiment, a video data sender may serve as a controller. Each of the superframes 61-64 includes a beacon frame 610, reserved channel time blocks (CTBs) 620, and unreserved channel time blocks (CTBs) 630. The beacon frame 610 is used to set the timing allocations and to communicate management information for the wireless system. The reserved channel time blocks 620 are used to transmit commands, isochronous streams, and asynchronous data connections. Each of reserved channel time blocks 620 can have single or multiple data frames. Data packets can be transmitted over the high-rate channel in the reserved channel time blocks 620. Acknowledgment signals (with or without beam-forming tracking data) can be transmitted over the low-rate channels. As shown in FIG. 6, only one of the two channels can be used for transmission at a given time. The unreserved channel time blocks 630 can be used to transmit CEC commands and MAC control and management commands on the low-rate channel. Beamforming transmission may not be allowed within the unreserved channel time blocks 630.

Data Size Adaptation for Wireless Transmission

Wireless communication systems can experience varying wireless channel conditions. Varying wireless channel conditions, particularly channel quality degradation, can adversely affect data transmission quality. In uncompressed audio/video (A/V) or audiovisual data transmission, because a large amount of data is transmitted over a wireless channel, channel quality degradation can significantly adversely affect the data transmission quality.

In one embodiment, the size of A/V data can be reduced at the wireless module of a source before the A/V data is transmitted over a wireless channel in response to changing wireless channel conditions. Then, the A/V data can be restored at the wireless module of a sink to have the original size. The term "wireless module" in the context of this document refers to a module configured to process A/V data for communication over a wireless channel. A wireless module can be either a wireless transmission module or a wireless receiver module, depending on its functionality. A wireless transmission module can be referred to as a "wireless transmitter." A wireless receiver module can be referred to as a "wireless receiver."

In another embodiment, without reducing the size of A/V data at the wireless transmitter of a source, the size of the A/V data can be restored at the wireless module of a sink if the A/V data has experienced a loss while being transmitted over a wireless channel. These configurations allow wireless systems to accommodate varying wireless channel conditions without changing A/V data formats.

FIG. 7 is a schematic block diagram illustrating a wireless communication system 700 for transmission of A/V data according to one embodiment. In the illustrated embodiment, the A/V data can be uncompressed A/V data. In the context of this document, the term "audio/video (A/V) data" or "audiovisual data" refers to video and/or audio data. Examples of types of video data include, but are not limited to, moving images, still images, animations, and graphic images.

The illustrated system 700 includes a source 701 and a sink 702. The source 701 includes an audio/video (A/V) input module 703 and a wireless transmission module (or wireless transmitter) 710. The sink 702 includes an A/V playback module 704 and a wireless receiver module (or wireless receiver) 720.

The A/V input module 703 is configured to provide A/V data to the wireless transmitter 710. The A/V input module 703 can be at least part of an MPEG2 decoder or uncompressed high definition video processor. The wireless transmitter 710 is configured to process the A/V data for transmission over a wireless channel 730, and to transmit the processed A/V data to the wireless receiver 720 over the wireless channel 730. The wireless receiver 720 is configured to process the A/V data back into its original form, and provide the A/V data to the A/V playback module 704. The A/V playback module 704 is configured to play back or store the A/V data. The A/V playback module 704 can be at least part of an HDTV, a monitor, or a projector. The wireless transmitter 710 and the wireless receiver 720 can use any suitable wireless technologies, for example, millimeter wave wireless technologies, Ultra Wide Band (UWB), or 802.11n. Any suitable wired interface (e.g., HDMI) can be used between the A/V input module 703 and the wireless transmitter 710 and between the A/V playback module 704 and the wireless receiver 720.

In the illustrated embodiment, each of the wireless transmitter 710 and the wireless receiver 720 includes an application and audio/video control (AVC) layer 711, 721, a media access control (MAC) layer 712, 722, and a physical (PHY) layer 713, 723. In the wireless transmitter 710, the application and AVC layer 711 moves an A/V stream to the MAC layer 712. Then, the MAC layer 712 partitions and packetizes the A/V stream into A/V packets. The MAC layer 712 then moves the A/V packets to the PHY layer 713, which modulates and sends the A/V packets over the wireless channel 730. After the A/V packets are transmitted to the wireless receiver 720, the receiver PHY layer 723 demodulates the A/V packets, and then moves the A/V packets to the receiver MAC layer 722. The receiver MAC layer 722 de-packetizes the A/V packets into an A/V stream, and moves the A/V stream to the receiver application and AVC layer 721. In the illustrated embodiment, control packets can also be exchanged between two neighboring ones of the layers 711-713, 721-723 of each of the wireless transmitter 710 and wireless receiver 720, as shown in FIG. 7. The control packets can include various control information such as connection control (e.g., audio, video, and/or data stream connection) and device control (e.g., power on/off and play/stop).

Ideally, an A/V stream is transmitted smoothly all the time from the wireless transmitter 710 to the wireless receiver 720 over the wireless channel 730. However, the quality of the wireless channel 730 can dynamically change from time to time. For example, the wireless channel (particularly when the wireless channel 730 is established by beam-forming) can be affected by the existence of an object or human being between the wireless transmitter 710 and the wireless receiver 720. When the quality of the wireless channel 730 degrades, the MAC/PHY layers 712, 713, 722, 723 of the wireless transmitter 710 and the wireless receiver 720 can change its modulation and coding scheme (MCS) to a lower level to keep the same bit error rate (BER) performance. The total data throughput decreases with the lower MCS level. This would not allow the wireless channel 730 to accommodate A/V data having the original data size.

Figure 8:
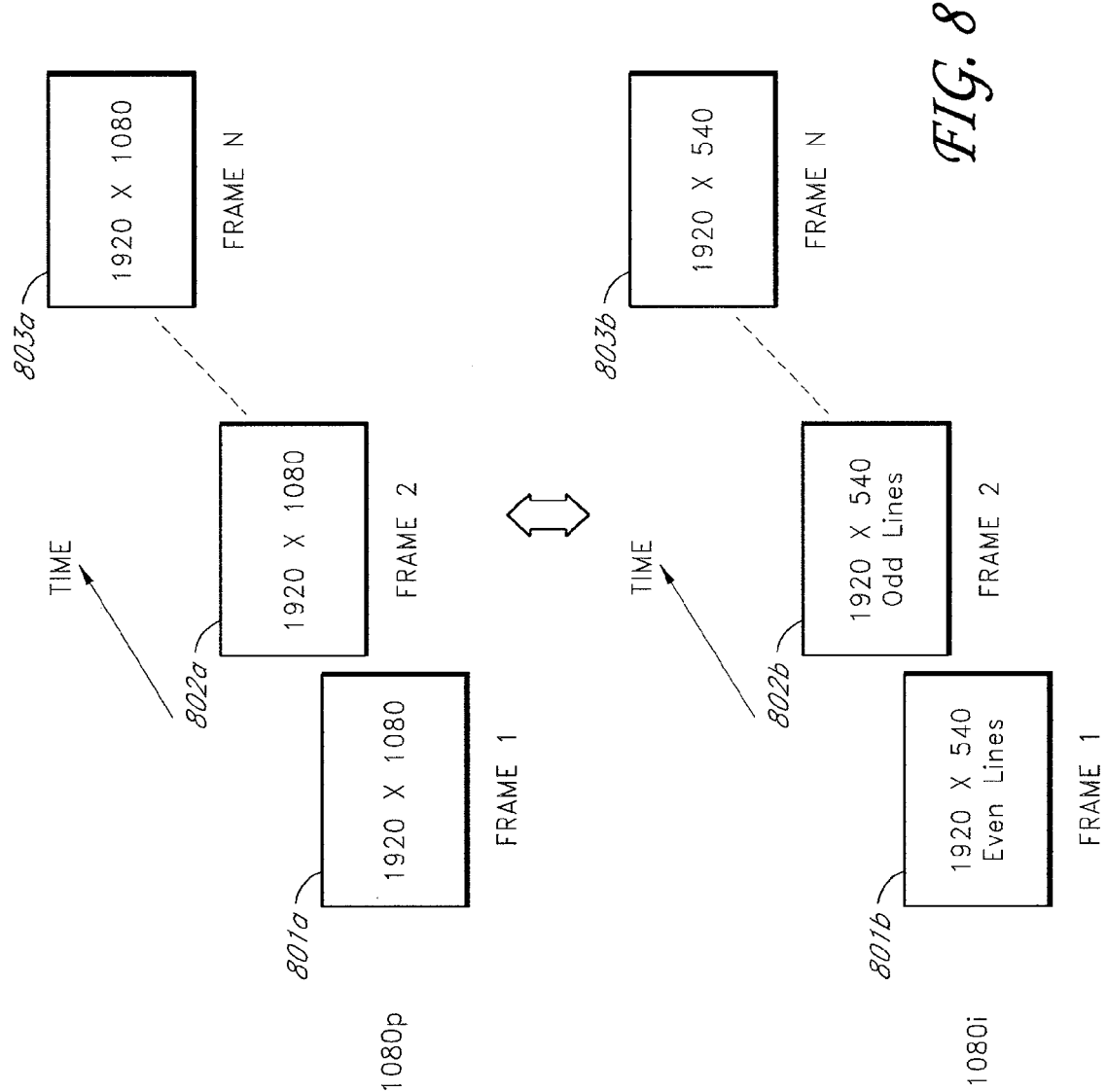
FIG. 8 is a diagram illustrating video frame formats of 1080p and 1080i.

One conventional approach to solve this problem is to adjust the data format of the A/V data at the A/V input module 703 on the transmission side and the A/V playback module 704 on the receiver side to fit into the reduced data transmission rate available at the wireless channel 730. For example, referring to FIGS. 7 and 8, at a normal wireless channel condition, the A/V input module 703 and A/V playback module 704 can use, for example, 1080p (progressive scan) video format in which each frame carries data with a frame resolution of 1920×1080. When the quality of the wireless channel 730 degrades, the A/V input module 703 and A/V playback module 704 can switch to 1080i (non-progressive or interlaced scan) video format in which each frame alternately carries only odd or even horizontal line data (1920×540) for the same frame resolution of 1920×1080. It can take at least several seconds for the A/V input module 703 and A/V playback module 704 to change or switch their video format. During the format switching, the video stream is temporarily stopped, which results in an interruption in playing back the video data. In certain instances, wireless channel quality degradation may only last very short time. In such instances, after relatively long format switching, the channel 730 may have already been restored to its normal condition. This can cause frequent format switching, which is not favorable to users.

Figure 9:
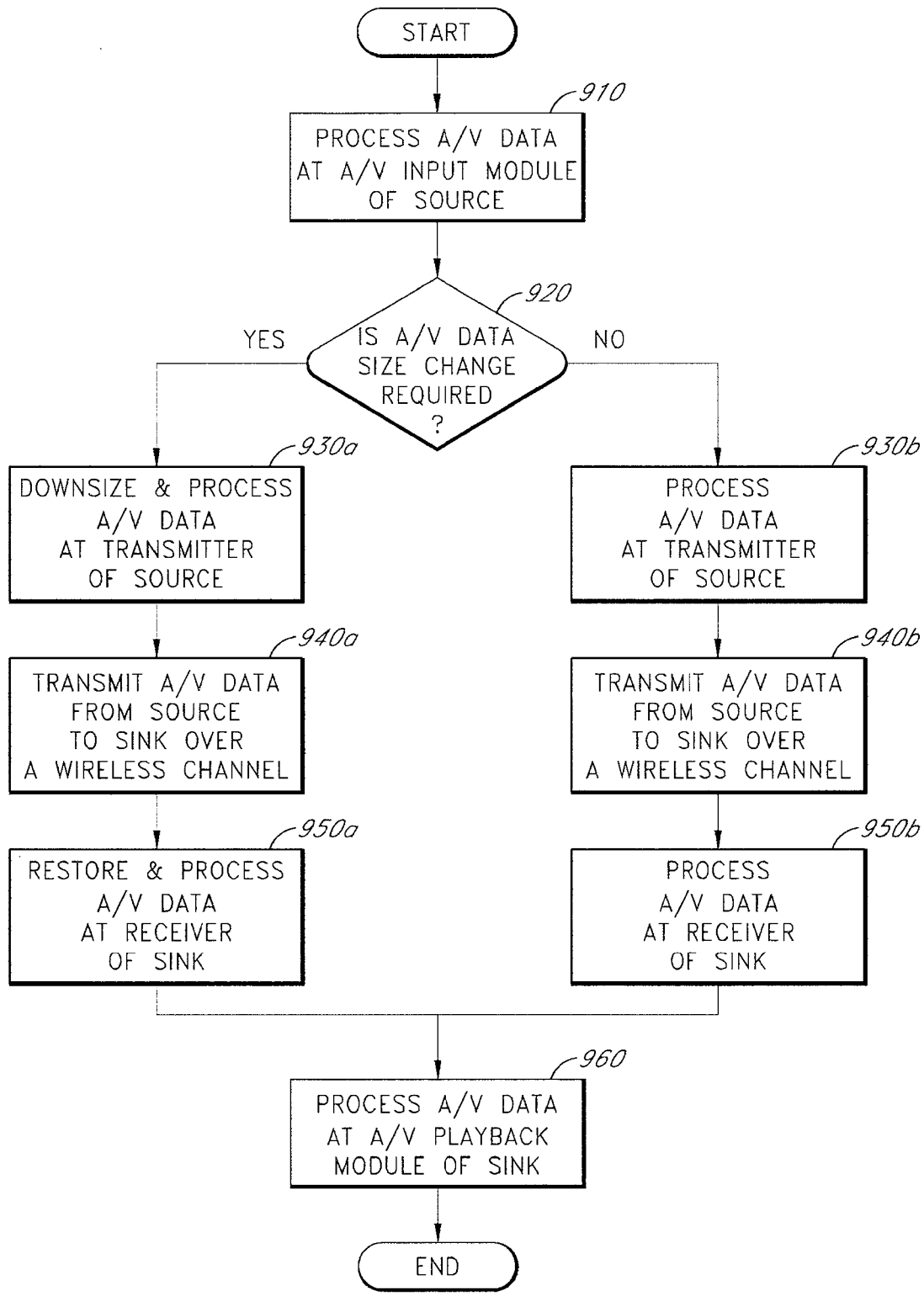
FIG. 9 is a flowchart illustrating a method of audiovisual data transmission over a wireless channel, according to one embodiment of the invention.

With reference to FIG. 9, a process of transmitting A/V data over a wireless channel according to one embodiment will be described. The illustrated process can be implemented in the context of the system of FIG. 7. It will be appreciated that some of the blocks in FIG. 9 can be omitted or combined with one another. It will also be appreciated that the order of the blocks can be changed in other embodiments.

In the illustrated method, no A/V data format switching is performed at the A/V input module of a source and the A/V playback module of a sink in response to the degradation of a wireless channel. Instead, A/V data is downsized at the wireless transmitter (e.g., at the application layer or the MAC layer of the wireless transmitter) of the source and is restored at the wireless receiver (e.g., at the application layer or the MAC layer of the wireless receiver) of the sink. Thus, the A/V input module of the source and the A/V playback module of the sink can maintain their A/V data format, regardless of changes in the wireless channel condition. This process can minimize or eliminate an A/V data stream interruption which would otherwise occur if data format switching is employed at the A/V input module and A/V playback module.

At block 910, A/V data is processed at the A/V input module of the source. For example, uncompressed video data can be pre-processed to have a certain video format. Before or while processing the A/V data, the quality of the wireless channel is monitored. If the wireless channel quality degrades, it is determined at block 920 whether it is required to reduce the size of the A/V data to accommodate a reduced transmission rate of the wireless channel. If the degree of degradation exceeds a threshold, the process goes to block 930a. If not, the process goes to blocks 930b-950b, in which the A/V data is transmitted to the wireless receiver of the sink using a normal process as described above in connection with FIG. 7.

At block 930a, the size of the A/V data is reduced at the wireless transmitter of the source. In downsizing the A/V data, various methods which will be described below can be employed. The A/V data can be further processed (e.g., partitioned and/or packetized) at the wireless transmitter. Although not shown, the A/V data can also be modulated for wireless transmission at the wireless transmitter.

At block 940a, the A/V data is transmitted from the wireless transmitter of the source to the wireless receiver of the sink over the wireless channel. At block 950a, the A/V data is demodulated, and then is restored to have the same data size as before being downsized. Various methods, examples of which will be described below, can be employed for restoring the A/V data size. The A/V data can also be processed (e.g., combined and/or de-packetized) at the wireless receiver.

At block 960, the A/V data is processed at the A/V playback module of the sink to regenerate the uncompressed A/V data. Optionally, the uncompressed A/V data can be played back. In another embodiment, the A/V data can be stored in a suitable data storage device.

Figure 10:
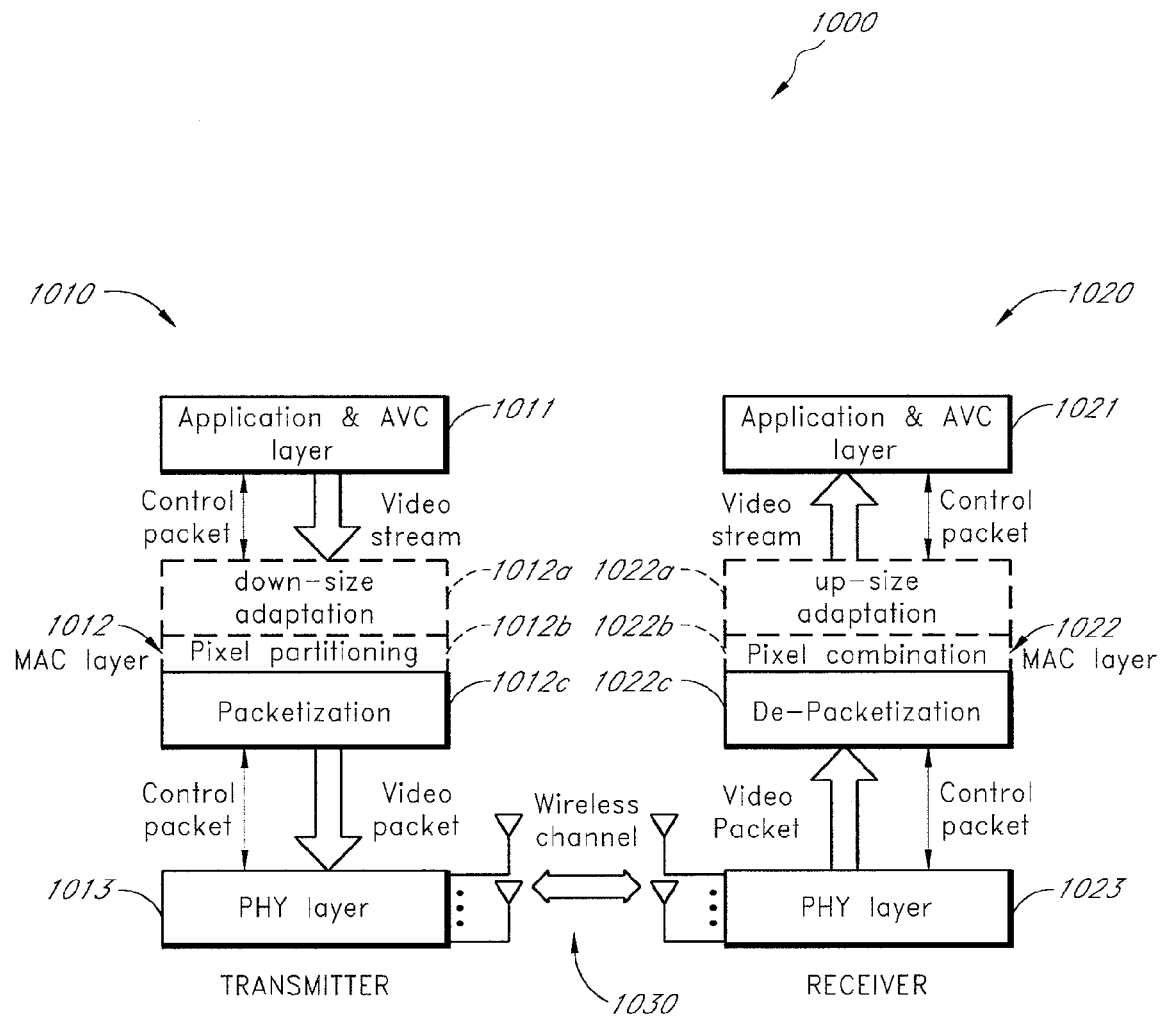
FIG. 10 is a block diagram of an example communication system having data size adaptation for wireless transmission of audiovisual data, according to one embodiment of the invention.

Referring to FIG. 10, a wireless system 1000 includes a wireless transmitter 1010 and a wireless receiver 1020 in wireless communication with each other over a wireless channel 1030 according to one embodiment. Each of the wireless transmitter 1010 and the wireless receiver 1020 includes an application and AVC layer 1011, 1021, a MAC layer 1012, 1022, and a PHY layer 1013, 1023. The application layer 1011 of the wireless transmitter 1010 is configured to receive video data from an A/V input module (not shown), as described above with respect to the application layer 711 of FIG. 7. The application layer 1021 of the wireless receiver 1020 is configured to transmit video data to an A/V playback module (not shown), as described above with respect to the application layer 721 of FIG. 7. In the illustrated embodiment, the MAC layer 1012 of the wireless transmitter 1010 is configured to downsize video data before packetizing the video data.

The MAC layer 1012 of the wireless transmitter 1010 can include a down-size adaptation block 1012a, a pixel partitioning block 1012b, and a packetization block 1012c. The down-size adaptation block 1012a is configured to downsize video data and send it to the pixel partitioning block 1012b. The pixel partitioning block 1012b partitions the video data and sends partitioned video data to the packetization block 1012c. The packetization block 1012c packetizes the video data into data packets suitable for wireless transmission.

The MAC layer 1022 of the wireless receiver 1020 can include an up-size adaptation block 1022a, a pixel combination block 1022b, and a de-packetization block 1022c. The de-packetization block 1022c de-packetizes data packets from the wireless transmitter 1010 into partitioned video data, and sends them to the pixel combination block 1022b. The pixel combination block 1022b combines the partitioned video data and sends the combined video data to the up-size adaptation block 1022b. The up-size adaptation block 1022a is configured to restore the size of the video data and send the data to the application layer 1021 of the wireless receiver 1020.

In one embodiment, the down-size adaptation block 1012a can discard a portion of the vide data to reduce the size of the video data. For example, for 1080p video frames (with a resolution of 1920×1080), the down-size adaptation block 1012a can discard the pixel data of even (or odd) horizontal lines of the frames, while keeping that of odd (or even) lines, thereby providing 1080i video frames. In another embodiment, the down-size adaptation block 1012a can further reduce the data size by converting 1080p video frames into 480p (progressive scan) video frames (with a resolution of 640×480). In such an embodiment, for horizontal data reduction, the size adaptation block 1012a can keep one pixel among three neighboring pixels in each line or calculate the average value of every three neighboring pixels. For vertical data reduction, the size adaptation block 1012a can select four (4) lines out of every nine (9) lines, for instance, the second, fourth, sixth, and eights lines out of each group of nine lines. The up-size adaptation block 1022a of the MAC layer 1022 of the wireless receiver 1020 can recover the original video data size by copying or interpolating neighboring pixel data horizontally and/or vertically.

In another embodiment, the down-size adaptation block 1012a can discard video frames periodically to reduce the video data size. For example, video data can have a frequency of 60 Hz (60 frames per second). The down-size adaptation block 1012a can discard every two frames, thereby converting the video data to have a frequency of 30 Hz. It will be appreciated that the down-size adaptation block 1012a can be configured to discard different number of frames depending on the wireless channel condition. The up-size adaptation block 1022a of the MAC layer 1022 of the wireless receiver 1020 can restore video data to have the original data size by copying or interpolating frames.

In yet another embodiment, the down-size adaptation block 1012a can reduce the number of bits for each pixel component (R, R, B or Y, U, V). For example, video data can have a color depth represented in 10 bits. The down-size adaptation block 1012a can reduce the number of the color depth bits by removing at least one least significant bit (LSB). In one embodiment, a bit shifting operation can be used for each pixel component to remove at least one least significant bit. For example, the color depth can be reduced from 10 bits to 8 bits by a 2-bit right shifting operation. The up-size adaptation block 1022a of the MAC layer 1022 of the wireless receiver 1020 can restore video data to have the original data size by performing a bit shifting operation in the opposite direction for each pixel component. For example, the color depth can be restored from 8 bits to 10 bits by a 2-bit left shifting operation. The at least one least significant bits can be restored by adding 0s or 1s to the color depth data.

A skilled technologist will appreciate that the size adaptation processes described above can be performed at the application layers of the wireless transmitter and receiver. A skilled technologist will also appreciate that various combinations of the embodiments described above are also possible. A skilled technologist will also appreciate that any other data reduction-recovery techniques can be adapted for or combined with the embodiments described above.

Figure 11:
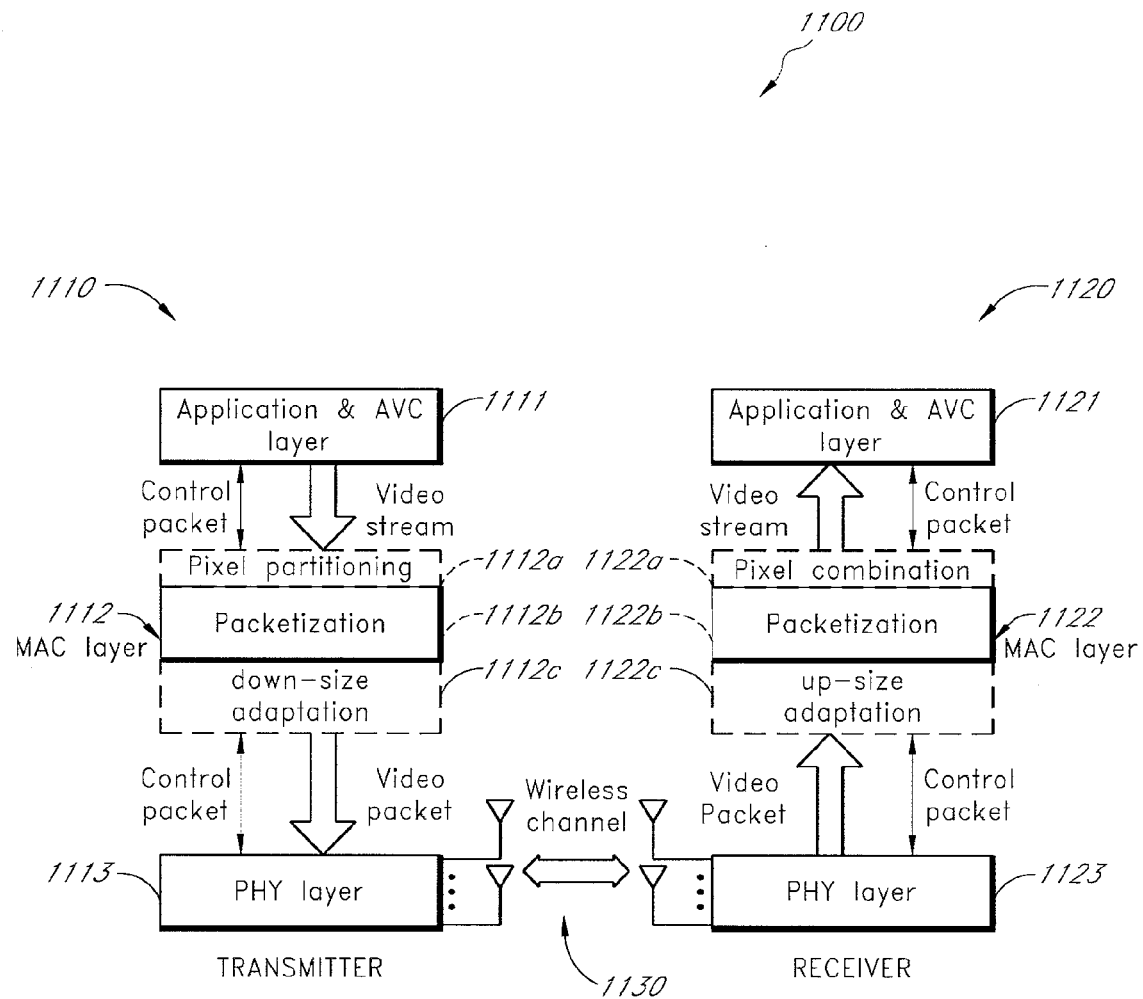
FIG. 11 is a block diagram of an example communication system having data size adaptation for wireless transmission of audiovisual data, according to another embodiment of the invention.

Referring to FIG. 11, a wireless system 1100 includes a wireless transmitter 1110 and a wireless receiver 1120 in wireless communication with each other over a wireless channel 1130 according to another embodiment. Each of the wireless transmitter 1110 and the wireless receiver 1120 includes an application and AVC layer 1111, 1121, a MAC layer 1112, 1122, and a PHY layer 1113, 1123. The application layer 1111 of the wireless transmitter 1110 is configured to receive video data from an A/V input module (not shown), as described above with respect to the application layer 711 of FIG. 7. The application layer 1121 of the wireless receiver 1120 is configured to transmit video data to an A/V playback module (not shown), as described above with respect to the application layer 721 of FIG. 7. In the illustrated embodiment, the MAC layer 1112 of the wireless transmitter 1110 is configured to downsize video data after packetizing the video data. The MAC layer 1112 of the wireless transmitter 1110 can include, a pixel partitioning block 1112a, a packetization block 1112b, a down-size adaptation block 1112c.

Figure 12:
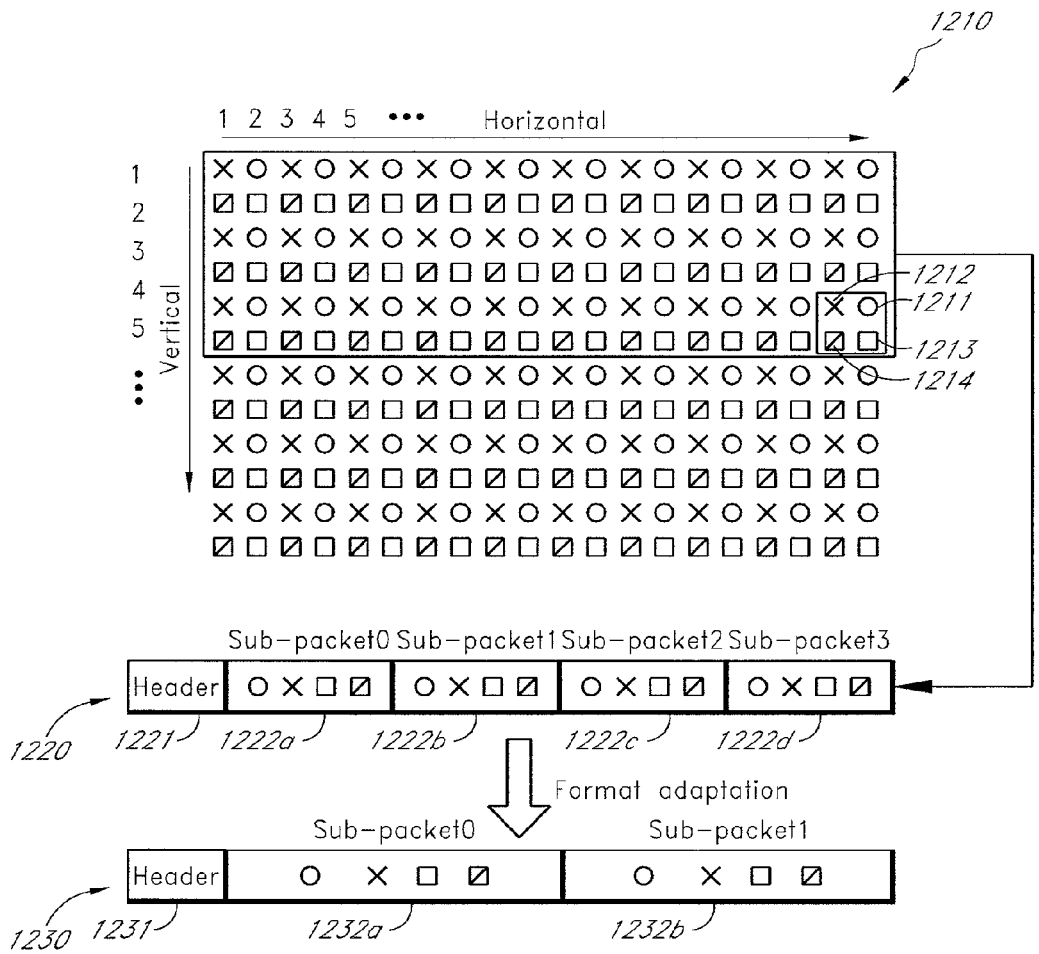
FIG. 12 is a diagram illustrating a method of downsizing audiovisual data transmitted over a wireless channel, according to one embodiment of the invention.

The pixel partitioning block 1112a partitions video data from the application layer 1111. In the illustrated embodiment, the pixel partitioning block 1112a divides video data into a plurality of pixel partitions. Referring to FIG. 12, the pixel partitioning block 1112a can divide a video frame 1210 into four partitions, partitions 0, 1, 2, 3. In the illustrated embodiment, each of the partitions 0, 1, 2, 3 includes spatially separated portions represented by symbols 1211-1214. Then, the pixel partitioning block 1112a sends the partitioned video data to the packetization block 1112b.

The packetization block 1112b packetizes the video data into video data packets. In the illustrated embodiment, the packetization block 1112b places the portions of the pixel partitions 0, 1, 2, 3 into different packets 1220 or different sub-packets 1222a-1222d in each of the packets 1220. The packetization block 1112b then sends the video data packets to the down-size adaptation block 1112c.

The down-size adaptation block 1112c is configured to downsize the data packets. The illustrated down-size adaptation block 1112c can discard some of the packets 1220 or sub-packets 1222a-1222d if the wireless channel quality degrades. The illustrated down-size adaptation block 1112c can discard the sub-packets 2 and 3 from the data packet 1220, as shown in FIG. 12, so as to produce a data packet 1230 having a reduced data size. It will be appreciated that the number of discarded packets or sub-packets can vary depending on the wireless channel condition. In certain embodiments in which each sub-packet should keep the same duration regardless of the channel condition or modulation and coding scheme (MCS), sub-packets remaining after the size adaptation operation may be further split so as to provide the required duration for wireless transmission. The down-size adaptation block 1112c then sends the downsized data packets to the PHY layer 1113 for wireless transmission.

The MAC layer 1122 of the wireless receiver 1120 can include a pixel combination block 1122a, and a de-packetization block 1122b, and an up-size adaptation block 1122c. The up-size adaptation block 1122c is configured to restore the data packets to their original size. The illustrated up-size adaptation block 1122c can reconstruct the discarded sub-packets by copying or interpolating other sub-packets. Then, the up-size adaptation block 1122c sends the restored data packets to the de-packetization block 1122b. The de-packetization block 1122b de-packetizes data packets into partitioned video data, and sends it to the pixel combination block 1122a. The pixel combination block 1122a combines the partitioned video data and send it to the application layer 1121 of the wireless receiver 1120.

A skilled technologist will appreciate that the size adaptation processes described above can be performed at the application layers of the wireless transmitter and receiver. A skilled technologist will appreciate that various combinations of the embodiments described above with respect to FIGS. 10-12 are also possible. A skilled technologist will also appreciate that any other data reduction-recovery techniques can be adapted for or combined with the embodiments described above.

The embodiments shown in FIGS. 10-12 are described in the context of video data transmission. However, the embodiments can be adapted for audio data transmission. For example, the system of FIG. 10 can be adapted for audio data transmission. In such an example, the MAC layers 1012, 1022 of the wireless transmitter 1010 and the wireless receiver 1020 may not include a pixel partitioning block 1012b, 1022b.

In one embodiment, audio data can include audio samples for multiple channels. The down-size adaptation block 1012a at the MAC layer 1012 of the wireless transmitter 1010 of FIG. 10 can discard audio samples for some of the multiple channels to reduce the data size. The up-size adaptation block 1022a at the MAC layer 1022 of the wireless receiver 1020 can reconstruct all audio channels by copying or interpolating the transmitted audio samples for the other channels.

In another embodiment, the down-size adaptation block 1012a at the MAC layer 1012 of the wireless transmitter 1010 of FIG. 10 can discard audio samples periodically or perform down-sampling to reduce the sampling rate to be suitable for a reduced transmission rate of the wireless channel. The up-size adaptation block 1022a at the MAC layer 1022 of the wireless receiver 1020 can recover the original audio sampling rate by copying or interpolating audio samples or by up-sampling.

In yet another embodiment, the down-size adaptation block 1012a at the MAC layer 1012 of the wireless transmitter 1010 of FIG. 10 can reduce the number of bits for each audio channel sample by a bit shifting operation, thereby removing at least one least significant bit (LSB). For example, the down-size adaptation block can reduce a sampling depth from 10 bits to 8 bits by a 2-bit right shifting operation for each audio channel sample. The up-size adaptation block 1022a at the MAC layer 1022 of the wireless receiver 1020 can recover the original audio sampling depth by a 2-bit left shifting operation for each audio channel sample. The at least one least significant bit can be restored by adding 0s or 1s to the audio data. A skilled technologist will appreciate that the size adaptation processes described above can be performed at the application layers of the wireless transmitter and receiver.

In certain embodiments, audio data size adaptation can be performed after packetization in a manner similar to that described in connection with FIGS. 11 and 12. It will be appreciated that various schemes can be used to downsize audio data after packetization depending on how audio data is packetized.

A skilled technologist will appreciate that various combinations of the embodiments described above are also possible. A skilled technologist will also appreciate that any other data reduction-recovery techniques can be adapted for or combined with the embodiments described above.

Figure 13:
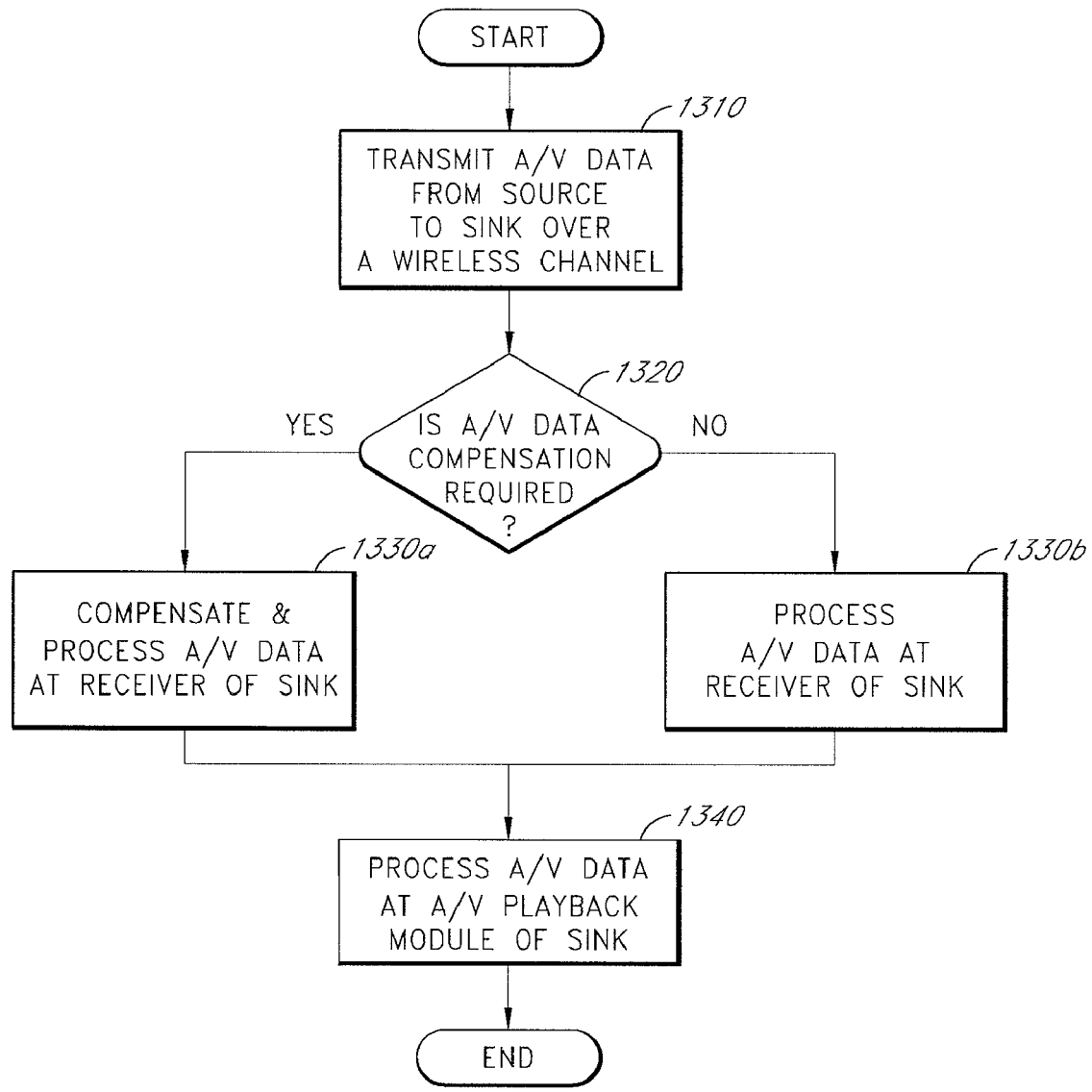
FIG. 13 is a flowchart illustrating a method of audiovisual data transmission over a wireless channel, according to another embodiment of the invention.

Referring to FIG. 13, a process of transmitting A/V data over a wireless channel according to another embodiment will be described. It will be appreciated that some of the blocks in FIG. 13 can be omitted or combined with one another. It will also be appreciated that the order of the blocks can be changed in other embodiments. In the illustrated method, no A/V data format switching is performed at the A/V input module of a source and the A/V playback module of a sink in response to the degradation of a wireless channel. Instead, A/V data which has suffered a loss while being transmitted over a wireless channel is restored to have its original data size at the wireless receiver of the sink. This process minimizes or eliminates an interruption during playback which would otherwise occur if data format switching at the application layer is employed.

At block 1310, A/V data is transmitted from a source to a sink over a wireless channel. Before or while transmitting the A/V data, the quality of the wireless channel is monitored. If the wireless channel quality degrades, it is determined whether it is required to provide data compensation for the A/V data transmitted over the wireless channel at block 1320. If the degree of channel quality degradation exceeds a threshold level, the process goes to block 1330a. If not, the A/V data is processed at the wireless receiver of the sink without data compensation (block 1330b), as described in connection with FIG. 7. Although not shown in detail, the A/V data can be demodulated at the PHY layer of the wireless receiver, and then can be processed at the MAC layer of the wireless receiver.

At block 1330a, the A/V data which has suffered a loss due to a degraded wireless channel is compensated to restore the original data size and/or quality using various compensation techniques. In one embodiment, degraded or missing pixels can be restored by copying neighboring pixels. In another embodiment, degraded or missing video frames or audio samples can be restored by copying or interpolating other video frames or audio samples.

At block 1340, the restored A/V data is processed at the A/V playback module of the sink to regenerate the uncompressed A/V data. Optionally, the uncompressed A/V data can be played back. In another embodiment, the A/V data can be stored in a certain data storage device.

In certain embodiments, wireless communication systems can include an up-size adaptation block at a wireless transmitter and a down-size adaptation block at a wireless receiver. For example, during a bandwidth reservation stage before A/V data transmission, the wireless channel can be in a degraded condition. In such a case, a more robust MCS scheme (with a lower data transmission rate) can be used at the beginning of A/V data transmission. During the A/V data transmission, the wireless channel can be restored to a normal condition in which a higher data rate can be accommodated with the same reserved bandwidth.

In one embodiment, up-size adaptation can be performed at the application or MAC layer of the transmitter by repeating or adding data to increase the data rate. For example, if an available video frame frequency changes from 30 Hz to 60 Hz, the transmitter can copy each frame to double the data rate. In another embodiment, the transmitter can add an interpolated frame between every two consecutive frames. In such an embodiment, the value of each pixel component can be calculated as the average value of the corresponding pixel components of the two consecutive frames.

At the receiver side, down-size adaptation can be performed to reduce the A/V data size to the original data size. For example, in an embodiment in which video frames are copied or interpolated at the transmitter, the receiver may remove some of the frames such that the video data is compatible with a data format supported by an associated playback module. In that case, the receiver may not use all data from the transmitter for playing back the A/V data. However, this configuration serves to reduce re-transmission of the A/V data because multiple data copies are transmitted to the receiver.

The embodiments described above can apply to various wireless communication systems. In one embodiment, a wireless system can have a full rate mode, a half rate mode, and a quarter rate mode for its wireless channels. The embodiments described above with respect to FIGS. 9-13 can be used for A/V data size adaptation when the wireless channel mode switches from one mode to another.

According to the embodiments described above, the A/V input module and A/V playback module can maintain their A/V data format, regardless of varying wireless channel conditions. This configuration provides A/V playback with substantially no interruption.

The foregoing description is that of embodiments of the invention and various changes, modifications, combinations and sub-combinations may be made without departing from the spirit and scope of the invention, as defined by the appended claims.

What is claimed is:

1. A method of wireless communication for audiovisual data, the method comprising:
   processing audiovisual data at the wireless module of a source, wherein processing the audiovisual data at the source wireless module comprises changing a size of the audiovisual data at a media access control (MAC) layer of the source wireless module in response to a change in the condition of a wireless channel, wherein the audiovisual data comprises a plurality of video frames, wherein changing the size of the audiovisual data comprises increasing the size of the audiovisual data by copying at least one video frame of the plurality of video frames of the audiovisual data; and
   transmitting the audiovisual data over the wireless channel.

2. The method of claim 1, wherein changing the size of the audiovisual data further comprises reducing the size of the audiovisual data in response to another change in the condition of the wireless channel.

3. The method of claim 2, wherein processing the audiovisual data at the source wireless module further comprises packetizing the audiovisual data after reducing the size of the audiovisual data.

4. The method of claim 3, wherein the audiovisual data comprises pixel data of a video frame, and wherein reducing the size of the audiovisual data comprises removing a portion of the pixel data.

5. The method of claim 4, wherein the portion of the pixel data comprises pixel data for even or odd lines of the video frame.

6. The method of claim 3, wherein the audiovisual data comprises a plurality of video frames, and wherein reducing the size of the audiovisual data comprises removing at least one video frame of the plurality of video frames.

7. The method of claim 3, wherein the audiovisual data comprises audio data for a plurality of channels, and wherein reducing the size of the audiovisual data comprises removing audio data for at least one channel of the plurality of channels.

8. The method of claim 3, wherein the audiovisual data comprises audio data of a plurality of audio samples, and wherein reducing the size of the audiovisual data comprises removing audio data of at least one audio sample of the plurality of audio samples.

9. The method of claim 3, wherein the audiovisual data are represented in a plurality of bits, and wherein reducing the size of the audiovisual data comprises removing at least one least significant bit (LSB) of the audiovisual data.

10. The method of claim 2, wherein processing the audiovisual data at the source wireless module further comprises packetizing the audiovisual data into a plurality of packets prior to reducing the size of the audiovisual data.

11. The method of claim 10, wherein reducing the size of the audiovisual data comprises removing at least one packet of the plurality of packets.

12. The method of claim 10, wherein each of the packets comprises a plurality of sub-packets, and wherein reducing the size of the audiovisual data comprises removing at least one sub-packet of the plurality of sub-packets.

13. The method of claim 2, further comprising restoring the size of the audiovisual data, wherein restoring the size of the audiovisual data comprises copying or interpolating a portion of the audiovisual data transmitted over the wireless channel.

14. The method of claim 1, wherein reducing the size of the audiovisual data comprises removing a portion of the audiovisual data transmitted over the wireless channel.

15. The method of claim 14, wherein the audiovisual data comprises a plurality of video frames, and wherein removing the portion of the audiovisual data comprises removing at least one video frame of the plurality of video frames transmitted over the wireless channel.

16. The method of claim 14, wherein the audiovisual data comprises a plurality of video frames, wherein increasing the size of the audiovisual data comprises interpolating two consecutive video frames of the plurality of video frames, and wherein removing the portion of the audiovisual data comprises removing at least one video frame of the plurality of video frames transmitted over the wireless channel.

17. The method of claim 1, wherein the audiovisual data is uncompressed audiovisual data.

18. A method of wireless communication for audiovisual data, the method comprising:
processing audiovisual data at the wireless module of a source, wherein processing the audiovisual data at the source wireless module comprises changing a size of the audiovisual data in response to a change in the condition of the wireless channel;
transmitting the audiovisual data from the source wireless module over a wireless channel; and
wherein changing the size of the audiovisual data comprises reducing the size of the audiovisual data,
wherein processing the audiovisual data at the source wireless module further comprises packetizing the audiovisual data into a plurality of packets prior to reducing the size of the audiovisual data,
wherein each of the packets comprises a plurality of sub-packets, and wherein reducing the size of the audiovisual data comprises removing at least one of the sub-packets, and
wherein reducing the size of the audiovisual data further comprises, after removing at least one of the sub-packets, splitting remaining sub-packets in the packet such that the packet has the same duration as before removing the at least one sub-packet.

19. The method of claim 18, wherein the source wireless module being in communication with a wireless module of a sink over a wireless channel, wherein transmitting the audiovisual data from the source wireless module comprises transmitting the audiovisual data to the sink wireless module over the wireless channel; and the method further comprising:
processing the audiovisual data at the sink wireless module, wherein processing the audiovisual data at the sink wireless module comprises restoring the size of the audiovisual data.

20. A system for wireless communication of audiovisual data, the system comprising:
a transmitter for transmitting audiovisual data over a wireless channel, the transmitter comprising an application layer, media access control (MAC) layer, and physical (PHY) layer, wherein the transmitter MAC layer changes a size of the audiovisual data in response to a change in the condition of the wireless channel; and
a receiver for receiving the audiovisual data over the wireless channel, the receiver comprising an application layer, MAC layer, and PHY layer, wherein the receiver MAC layer or the receiver application layer restores the size of the audiovisual data,
wherein the at least one of the transmitter MAC layer and the transmitter application layer is configured to increase the size of the audiovisual data,
wherein the audiovisual data comprises a plurality of video frames, and
wherein the at least one of the transmitter MAC layer and the transmitter application layer is configured to copy at least one video frame of the plurality of video frames.

21. The system of claim 20, wherein the transmitter MAC layer reduces the size of the audiovisual data in response to another change in the condition of the wireless channel.

22. The system of claim 21, wherein the transmitter MAC layer is further configured to packetize the audiovisual data after reducing the size of the audiovisual data.

23. The system of claim 22, wherein the audiovisual data comprises pixel data of a video frame, and wherein the transmitter MAC layer is configured to remove a portion of the pixel data.

24. The system of claim 23, wherein the portion of the pixel data comprises pixel data for even or odd lines of the video frame.

25. The system of claim 22, wherein the audiovisual data comprises a plurality of video frames, and wherein the transmitter MAC layer is configured to remove at least one video frame of the plurality of video frames.

26. The system of claim 22, wherein the audiovisual data comprises audio data for a plurality of channels, and wherein the transmitter MAC layer is configured to remove audio data for at least one channel of the plurality of channels.

27. The system of claim 22, wherein the audiovisual data comprises audio data of a plurality of audio samples, and wherein the transmitter MAC layer is configured to remove audio data of at least one audio sample of the plurality of audio samples.

28. The system of claim 22, wherein the audiovisual data are represented in a plurality of bits, and wherein the transmitter MAC layer is configured to remove at least one least significant bit (LSB) of the audiovisual data.

29. The system of claim 21, wherein the transmitter MAC layer is further configured to packetize the audiovisual data prior to reducing the size of the audiovisual data.

30. The system of claim 29, wherein the transmitter MAC layer is configured to remove at least one of the packets.

31. The system of claim 29, wherein each of the packets comprises a plurality of sub-packets, and wherein the transmitter MAC layer is configured to remove at least one sub-packet of the plurality of sub-packets.

32. The system of claim 21, wherein the receiver MAC layer or the receiver application layer is configured to copy or interpolate a portion of the audiovisual data transmitted over the wireless channel.

33. The system of claim 20, wherein the receiver MAC layer or the receiver application layer is configured to reduce the size of the audiovisual data.

34. The system of claim 33, wherein the audiovisual data comprises a plurality of video frames, and wherein the receiver MAC layer or the receiver application layer is configured to remove at least one video frame of the plurality of video frames transmitted over the wireless channel.

35. The system of claim 33, wherein the audiovisual data comprises a plurality of video frames, wherein the transmitter MAC layer or the transmitter application layer is configured to interpolate two consecutive video frames of the plurality of video frames, and wherein the receiver MAC layer or the receiver application layer is configured to remove at least one of the video frames transmitted over the wireless channel.

36. The system of claim 20, wherein the audiovisual data is uncompressed audiovisual data.

37. A system for wireless communication of audiovisual data, the system comprising:
a transmitter for transmitting audiovisual data over a wireless channel, the transmitter comprising an application layer, media access control (MAC) layer, and physical (PHY) layer, wherein the transmitter MAC layer or the transmitter application layer changes the size of the audiovisual data in response to a change in the condition of the wireless channel; and
a receiver for receiving the audiovisual data over the wireless channel, the receiver comprising an application layer, MAC layer, and PHY layer, wherein the receiver MAC layer or the receiver application layer restores the size of the audiovisual data,
wherein the transmitter MAC layer or the transmitter application layer reduces the size of the audiovisual data,
wherein the transmitter MAC layer is further configured to packetize the audiovisual data prior to reducing the size of the audiovisual data,
wherein each of the packets comprises a plurality of sub-packets, and wherein the transmitter MAC layer is configured to remove at least one of the sub-packets, and
wherein the transmitter MAC layer is configured to split remaining sub-packets in the packet after removing at least one of the sub-packets such that the packet has the same duration as before removing the at least one sub-packet.

38. A wireless communication device for transmitting audiovisual data, the device comprising a transmitter for transmitting audiovisual data over a wireless channel, the transmitter comprising:
an application layer;
a media access control (MAC) layer; and
a physical (PHY) layer,
wherein the MAC layer changes the size of the audiovisual data in response to a change in the condition of the wireless channel,
wherein the MAC layer is configured to increase the size of the audiovisual data,
wherein the audiovisual data comprises a plurality of video frames, and
wherein the MAC layer is configured to copy at least one of the plurality of video frames.

39. A wireless communication device for receiving audiovisual data, the device comprising a receiver for receiving audiovisual data over a wireless channel, the receiver comprising:
an application layer;
a media access control (MAC) layer; and
a physical (PHY) layer,
wherein the MAC layer changes the size of the audiovisual data in response to a change in the condition of the wireless channel,
wherein the transmitter MAC layer or the transmitter application layer is configured to increase the size of the audiovisual data,
wherein the audiovisual data comprises a plurality of video frames, and
wherein the transmitter MAC layer or the transmitter application layer is configured to interpolate two consecutive video frames of the plurality of video frames.

40. A method of wireless communication for audiovisual data, the method comprising:
receiving audiovisual data at a receiver from a wireless channel, the receiver comprising a media access control (MAC) layer and an application layer;
determining the condition of the wireless channel; and
changing the size of the audiovisual data at the MAC layer in response to the wireless channel condition determining,
wherein the MAC layer or the application layer is configured to reduce the size of the audiovisual data,
wherein the audiovisual data comprises a plurality of video frames, and
wherein the MAC layer or the application layer is configured to remove at least one video frame of the plurality of video frames transmitted over the wireless channel.

41. The method of claim 40, wherein changing the size of the audiovisual data comprises increasing the size of the audiovisual data by copying or interpolating a portion of the audiovisual data.

42. The method of claim 40, wherein changing the size of the audiovisual data comprises reducing the size of the audiovisual data by removing a portion of the audiovisual data transmitted over the wireless channel.

43. A system for wireless communication of audiovisual data, the system comprising:
a transmitter for transmitting audiovisual data over a wireless channel; and
a receiver for receiving the audiovisual data over the wireless channel, the receiver comprising a media access control (MAC) layer and an application layer,
wherein the system is determines the condition of the wireless channel;
wherein the transmitter does not change the size of the audiovisual data in response to a change in the wireless channel condition, and wherein the MAC layer of the receiver changes the size of the audiovisual data in response to the change in the wireless channel condition, wherein the transmitter MAC layer or the transmitter application layer is configured to increase the size of the audiovisual data, wherein the audiovisual data comprises a plurality of video frames, and wherein the transmitter MAC layer or the transmitter application layer is configured to copy at least one video frame of the plurality of video frames.

44. The system of claim 43, wherein the MAC layer increases the size of the audiovisual data by copying or interpolating a portion of the audiovisual data.

45. A method of wireless communication for audiovisual data, the method comprising:

changing size of the audiovisual data in response to a change in the condition of a wireless channel, wherein changing the size of the audiovisual data comprises reducing the size of the audiovisual data;

packetizing the audiovisual data into a plurality of packets prior to reducing the size of the audiovisual data, receiving the audiovisual data at a sink wireless module over the wireless channel; and processing the audiovisual data at the sink wireless module, wherein processing the audiovisual data at the sink wireless module comprises restoring the size of the audiovisual data, wherein each of the packets comprises a plurality of sub-packets, and wherein reducing the size of the audiovisual data comprises removing at least one of the sub-packets, and wherein reducing the size of the audiovisual data further comprises, after removing at least one of the sub-packets, splitting remaining sub-packets in the packet such that the packet has the same duration as before removing the at least one sub-packet.

46. A method of wireless communication for audiovisual data, the method comprising:

receiving the audiovisual data by a wireless module of the sink over a wireless channel; and processing the audiovisual data at a sink wireless module, wherein processing the audiovisual data at the sink wireless module comprises restoring a size of the audiovisual data, wherein restoring the size of the audiovisual data comprises removing a portion of the audiovisual data transmitted over the wireless channel comprising removing at least one of the video frames transmitted over the wireless channel.

47. A method of wireless communication for audiovisual data, the method comprising:

processing audiovisual data at the wireless module of a source, wherein processing the audiovisual data at the source wireless module comprises changing a size of the audiovisual data at a media access control (MAC) layer of the source wireless module in response to a change in the condition of a wireless channel, wherein changing the size of the audiovisual data comprises increasing the size of the audiovisual data by interpolating two consecutive ones of a plurality of video frames of the audiovisual data;

transmitting the audiovisual data over the wireless channel; and processing the audiovisual data comprising restoring the size of the audiovisual data.

48. A system for wireless communication of audiovisual data, the system comprising:

a transmitter for transmitting audiovisual data over a wireless channel, the transmitter comprising an application layer, media access control (MAC) layer, and physical (PHY) layer, wherein the transmitter MAC layer changes the size of the audiovisual data in response to a change in the condition of the wireless channel; and a receiver for receiving the audiovisual data over the wireless channel, the receiver comprising an application layer, MAC layer, and PHY layer, wherein the receiver MAC layer or the receiver application layer restores the size of the audiovisual data, wherein the transmitter MAC layer or the transmitter application layer is configured to increase the size of the audiovisual data, wherein the audiovisual data comprises a plurality of video frames, and wherein the transmitter MAC layer or the transmitter application layer is configured to interpolate two consecutive video frames of the plurality of video frames.

49. A system for wireless communication of audiovisual data, the system comprising:

a transmitter for transmitting audiovisual data over a wireless channel, the transmitter comprising an application layer, media access control (MAC) layer, and physical (PHY) layer, wherein the transmitter MAC layer changes a size of the audiovisual data in response to a change in the condition of the wireless channel; and a receiver for receiving the audiovisual data over the wireless channel, the receiver comprising an application layer, MAC layer, and PHY layer, wherein the receiver MAC layer or the receiver application layer restores the size of the audiovisual data, wherein the receiver MAC layer or the receiver application layer is configured to reduce the size of the audiovisual data, and wherein the receiver MAC layer or the receiver application layer is configured to remove at least one of the video frames transmitted over the wireless channel.

50. A system for wireless communication of audiovisual data, the system comprising:

a transmitter for transmitting audiovisual data over a wireless channel; and a receiver for receiving the audiovisual data over the wireless channel, the receiver comprising a media access control (MAC) layer and an application layer, wherein the system determines the condition of the wireless channel;

wherein the transmitter does not change a size of the audiovisual data in response to a change in the wireless channel condition, and wherein the MAC layer of the receiver changes the size of the audiovisual data in response to the change in the wireless channel condition, wherein the receiver MAC layer or the receiver application layer is configured to reduce the size of the audiovisual data, and wherein the receiver MAC layer or the receiver application layer is configured to remove at least one of the video frames transmitted over the wireless channel.

* * * * *